(12) United States Patent
Han et al.

(10) Patent No.: US 9,756,541 B2
(45) Date of Patent: Sep. 5, 2017

(54) HANDOVER PROCESSING METHOD, APPARATUS, AND SYSTEM

(71) Applicant: HUAWEI TECHNOLOGIES CO., LTD., Shenzhen (CN)

(72) Inventors: Jing Han, Beijing (CN); Dengkun Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/980,613

(22) Filed: Dec. 28, 2015

(65) Prior Publication Data
US 2016/0112922 A1   Apr. 21, 2016

Related U.S. Application Data

(63) Continuation of application No. PCT/CN2013/078493, filed on Jun. 29, 2013.

(51) Int. Cl.
*H04W 36/00* (2009.01)
*H04W 36/24* (2009.01)
(Continued)

(52) U.S. Cl.
CPC .......... *H04W 36/24* (2013.01); *H04W 24/02* (2013.01); *H04W 24/10* (2013.01); *H04W 36/04* (2013.01); *H04W 72/12* (2013.01); *H04W 88/12* (2013.01)

(58) Field of Classification Search
CPC .......... H04W 36/0094; H04W 84/047; H04W 36/24; H04W 24/02; H04W 88/12;
(Continued)

(56) References Cited

U.S. PATENT DOCUMENTS 8,218,500 B2 * 7/2012 Kangude .......... H04W 36/0072
370/331
8,301,151 B2   10/2012 Back
(Continued)

FOREIGN PATENT DOCUMENTS

CN   101431776 A   5/2009
CN   101877895 A   11/2010
(Continued)

OTHER PUBLICATIONS

International Search Report dated Apr. 3, 2014 in corresponding International Patent Application No. PCT/CN2013/078493.
(Continued)

*Primary Examiner* — Mahendra Patel
(74) *Attorney, Agent, or Firm* — Staas & Halsey LLP

(57) ABSTRACT

A handover processing method, apparatus, and system include: receiving a first handover trigger message sent by a first network element node; and sending a second handover trigger message to a second network element node according to the first handover trigger message, so that the second network element node hands over user equipment UE from the first network element node to the second network element node according to the second handover trigger message. Handover between small cells or between a small cell and a macro cell is implemented, and because a controller is used to perform handover, a handover delay is effectively reduced, and network performance is improved.

15 Claims, 7 Drawing Sheets

(51) Int. Cl.
  *H04W 24/02* (2009.01)
  *H04W 24/10* (2009.01)
  *H04W 36/04* (2009.01)
  *H04W 72/12* (2009.01)
  *H04W 88/12* (2009.01)

(58) Field of Classification Search
  CPC ..... H04W 36/04; H04W 72/12; H04W 24/10; H04W 36/30; H04W 36/0083; H04B 7/2606
  USPC ...... 455/436, 433, 432.1, 434; 370/331, 338
  See application file for complete search history.

(56) References Cited

U.S. PATENT DOCUMENTS

| | | | |
|---|---|---|---|
| 2006/0034229 A1* | 2/2006 | Joo | H04W 36/14 370/335 |
| 2007/0081492 A1* | 4/2007 | Petrovic | H04L 1/1812 370/331 |
| 2008/0076432 A1* | 3/2008 | Senarath | H04W 36/18 455/442 |
| 2008/0153495 A1* | 6/2008 | Ogami | H04W 36/30 455/436 |
| 2008/0175204 A1* | 7/2008 | Jen | H04L 1/0041 370/331 |
| 2009/0005031 A1* | 1/2009 | Van Lieshout | H04W 36/32 455/425 |
| 2009/0310563 A1* | 12/2009 | Chou | H04L 27/0006 370/331 |
| 2009/0323639 A1 | 12/2009 | Kim et al. | |
| 2010/0118752 A1* | 5/2010 | Suzuki | H04W 76/048 370/311 |
| 2010/0273487 A1* | 10/2010 | Alonso-Rubio | H04W 36/385 455/436 |
| 2010/0273488 A1* | 10/2010 | Kim | H04W 24/10 455/436 |
| 2010/0285831 A1* | 11/2010 | Jung | H04L 27/0012 455/524 |
| 2011/0195708 A1* | 8/2011 | Moberg | H04W 36/0094 455/424 |
| 2011/0200014 A1* | 8/2011 | Lee | H04W 36/0083 370/332 |
| 2011/0275374 A1* | 11/2011 | Narasimha | H04L 5/0007 455/436 |
| 2011/0280127 A1* | 11/2011 | Raaf | H04L 45/125 370/230 |
| 2012/0002643 A1* | 1/2012 | Chung | H04J 11/0093 370/331 |
| 2012/0113862 A1* | 5/2012 | Santhanam | H04W 84/045 370/254 |
| 2012/0142354 A1* | 6/2012 | Ahluwalia | H04W 36/0072 455/436 |
| 2012/0282932 A1* | 11/2012 | Yu | H04W 84/005 455/437 |
| 2012/0297009 A1 | 11/2012 | Amir et al. | |
| 2012/0315949 A1* | 12/2012 | Zhang | H04W 24/08 455/525 |
| 2013/0040692 A1* | 2/2013 | Chen | H04W 36/04 455/525 |

FOREIGN PATENT DOCUMENTS

| | | | |
|---|---|---|---|
| CN | 101986748 A | | 3/2011 |
| CN | 101877895 B | * | 4/2014 |
| EP | 1 773 075 A2 | | 4/2007 |
| EP | 2 426 994 A1 | | 3/2012 |
| WO | 2011/099919 A1 | | 8/2011 |
| WO | 2012/061770 A2 | | 5/2012 |

OTHER PUBLICATIONS

Extended European Search Report dated Jun. 9, 2016 in corresponding European Patent Application No. 13888304.6.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, Valbonne, France, 344 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, Valbonne, France, 209 pages.
International Search Report mailed Apr. 3, 2014, in corresponding International Application No. PCT/CN2013/078493.

* cited by examiner

HANDOVER PROCESSING METHOD, APPARATUS, AND SYSTEM

CROSS-REFERENCE TO RELATED APPLICATIONS

This application is a continuation of International Application No. PCT/CN2013/078493, filed on Jun. 29, 2013, which is incorporated herein by reference in its entirety.

TECHNICAL FIELD

Embodiments of the present invention relate to communications technologies, and in particular, to a handover processing method, apparatus, and system.

BACKGROUND

With the development of mobile communications technologies and the massive deployment of the 3rd generation mobile communications technology (3G for short) networks, high-rate and high-bandwidth services are bringing rich and colorful application experience to people. Especially, recently, a massive growth of smart phones injects new life to communications and also brings more challenges to operation.

In a 3G network, multiple small cells are often deployed in a macro cell, so as to provide better network services to user equipment (UE). When UE moves, a UE handover problem is involved. In the prior art, the 3GPP specifies UE handover procedures in its Release 8/9 protocol. The prior art is described below by using an example in which UE is handed over from a small cell (a serving cell) to another small cell (a target cell): First, the UE sends a measurement report to the serving cell; then, the serving cell sends a handover request to the target cell, so that the target cell performs admission control; then, the target cell sends a handover response to the serving cell; after receiving the handover response, the serving cell sends a handover command to the UE; and the UE performs downlink synchronization and uplink random access (RA for short) processes with respect to the target cell according to the handover command, and finally, the UE sends a handover complete command to the target cell.

However, in a scenario in which small cells are intensively deployed, moving UE may pass through multiple small cells in a short time, and performing a handover procedure according to the prior art will cause an excessively long handover delay and degraded network performance.

SUMMARY

The present invention provides a handover processing method, apparatus, and system, which are used to improve efficiency of handover of moving UE between cells.

A first aspect of the present invention provides a handover processing method, including:
receiving a first handover trigger message sent by a first network element node; and
sending a second handover trigger message to a second network element node according to the first handover trigger message, so that the second network element node hands over user equipment UE from the first network element node to the second network element node according to the second handover trigger message.

With reference to the first aspect of the present invention, in a first possible implementation manner, the first handover trigger message is a measurement report;
the receiving a first handover trigger message sent by a first network element node includes:
receiving the measurement report sent by the first network element node; and after the receiving the measurement report sent by the first network element node, the method further includes:
sending a stop command message to the first network element node, so that the first network element node stops scheduling for the UE.

With reference to the first aspect of the present invention, in a second possible implementation manner, the first handover trigger message is a handover request message;
the receiving a first handover trigger message sent by a first network element node includes:
receiving the handover request message sent by the first network element node; and
after the receiving the handover request message sent by the first network element node, the method includes:
sending a stop command message to the first network element node, so that the first network element node stops scheduling for the UE.

With reference to the first aspect of the present invention, the first possible implementation manner of the first aspect, and the second possible implementation manner of the first aspect, in a third possible implementation manner, the second handover trigger message is a scheduling message; and
the sending a second handover trigger message to a second network element node according to the first handover trigger message includes:
sending the scheduling message to the second network element node, so that the second network element node forwards the scheduling message to the UE to complete the handover, where
the scheduling message includes resource assignment information, a modulation and coding message, codebook information, and power control information.

With reference to the first aspect of the present invention, in a fourth possible implementation manner, the first handover trigger message is a measurement report;
the receiving a first handover trigger message sent by a first network element node includes:
receiving the measurement report sent by the first network element node; and
after the receiving the measurement report sent by the first network element node, the method includes:
determining, according to the measurement report, to hand over the UE to the second network element node.

With reference to the first aspect of the present invention and the fourth possible implementation manner of the first aspect, in a fifth possible implementation manner, the second handover trigger message is a handover request message;
the sending a second handover trigger message to a second network element node includes:
sending the handover request message to the second network element node, where the handover request message includes a first identifier of the UE, where
the first identifier uniquely identifies a sequence number of the UE in the first network element node; and
after the sending the handover request message to the second network element node, the method includes:

receiving a handover response message sent by the second network element node, where the handover response message includes the first identifier of the UE and a second identifier of the UE, where the second identifier uniquely identifies a sequence number of the UE in the second network element node; and forwarding the handover response message to the first network element node, so that the first network element node forwards a handover command to the UE to complete the handover.

With reference to the first aspect of the present invention and the fourth possible implementation manner of the first aspect, in a sixth possible implementation manner, the second handover trigger message is a handover request message;

the sending a second handover trigger message to a second network element node includes:

sending the handover request message to the second network element node, where the handover request message includes a third identifier of the UE and a fourth identifier, where the third identifier uniquely identifies a sequence number of the UE in a controller, and the fourth identifier is an identity of the first network element node; and after the sending the handover request message to the second network element node, the method includes:

receiving a handover response message sent by the second network element node, where the handover response message includes the third identifier of the UE, the fourth identifier, and the second identifier of the UE, where the second identifier uniquely identifies a sequence number of the UE in the second network element node; and forwarding the handover response message to the first network element node, so that the first network element node forwards a handover command to the UE to complete the handover.

With reference to the first aspect of the present invention, the fourth possible implementation manner of the first aspect, the fifth possible implementation manner of the first aspect, and the sixth possible implementation manner of the first aspect, in a seventh possible implementation manner, the second handover trigger message is a handover request message;

the sending a second handover trigger message to a second network element node includes:

sending the handover request message to the second network element node, where the handover request message includes the first identifier and the third identifier of the UE; and after the sending the handover request message to the second network element node, the method includes:

receiving a handover response message sent by the second network element node, where the handover response message includes the first identifier and the third identifier of the UE and the second identifier of the UE; and forwarding the handover response message to the first network element node, so that the first network element node forwards a handover command to the UE to complete the handover.

With reference to the first aspect of the present invention and the implementation manners of the first aspect, in an eighth possible implementation manner, the method further includes: if the first network element node is a macro base station, receiving a handover indication message sent by the first network element node, and forwarding the handover indication message to the UE, so that the UE is handed over to the first network element node; or if the second network element node is a macro base station, receiving a handover indication message sent by the second network element node, and forwarding the handover indication message to the UE, so that the UE is handed over to the second network element node.

A second aspect of the present invention provides a handover processing method, including:

receiving a measurement report sent by user equipment UE; and sending a first handover trigger message to a controller according to the measurement report, so that the controller sends a second handover trigger message to a second network element node according to the first handover trigger message, so as to hand over the UE from a first network element node to the second network element node.

With reference to the second aspect of the present invention, in a first possible implementation manner, the first handover trigger message is the measurement report; and the sending a first handover trigger message to a controller according to the measurement report includes:

forwarding the measurement report to the controller.

With reference to the second aspect of the present invention, in a second possible implementation manner, the first handover trigger message is a handover request message; and the sending a first handover trigger message to a controller according to the measurement report includes:

determining, according to the measurement report, to hand over the UE to the second network element node; and sending the handover request message to the controller.

With reference to the first possible implementation manner of the second aspect of the present invention and the second possible implementation manner of the second aspect, in a third possible implementation manner, after the sending a first handover trigger message to a controller according to the measurement report, the method further includes:

receiving a stop command message sent by the controller, and stopping scheduling for the UE according to the stop command message.

With reference to the second aspect of the present invention, in a fourth possible implementation manner, the first handover trigger message is the measurement report;

the sending a first handover trigger message to a controller according to the measurement report includes:

forwarding the measurement report to the controller; and after the forwarding the measurement report to the controller, the method further includes:

receiving a handover response message sent by the controller, where the handover response message includes the first identifier of the UE and a second identifier of the UE, where the first identifier uniquely identifies a sequence number of the UE in the first network element node, and the second identifier uniquely identifies a sequence number of the UE in the second network element node; and sending a handover command to the UE according to the handover response message, so that the UE is handed over from the first network element node to the second network element node according to the handover command.

With reference to the fourth possible implementation manner of the second aspect of the present invention, in a fifth possible implementation manner, the first handover trigger message is the measurement report;

the sending a first handover trigger message to a controller according to the measurement report includes:

forwarding the measurement report to the controller; and after the forwarding the measurement report to the controller, the method further includes:

receiving a handover response message sent by the controller, where the handover response message includes the third identifier of the UE, the fourth identifier, and the second identifier of the UE, where the third identifier uniquely identifies a sequence number of the UE in the controller, and the fourth identifier is an identity of the first network element node; and sending a handover command to the UE according to the handover response message, so that the UE is handed over from the first network element node to the second network element node according to the handover command.

With reference to the fourth possible implementation manner of the second aspect of the present invention and the fifth possible implementation manner of the second aspect, in a sixth possible implementation manner, the first handover trigger message is the measurement report;

the sending a first handover trigger message to a controller according to the measurement report includes:

forwarding the measurement report to the controller; and after the forwarding the measurement report to the controller, the method further includes:

receiving a handover response message sent by the controller, where the handover response message includes the first identifier and the third identifier of the UE and the second identifier of the UE; and sending a handover command to the UE according to the handover response message, so that the UE is handed over from the first network element node to the second network element node according to the handover command.

With reference to the second aspect of the present invention and the possible implementation manners of the second aspect, in a seventh possible implementation manner, the method further includes:

acquiring a real-time movement speed of the UE, and comparing the real-time movement speed with a threshold; and if the real-time movement speed is greater than or equal to the threshold, sending a handover indication message to the controller, and forwarding the handover indication message to the UE, so that the UE is handed over to the first network element node; and sending a configuration stop indication to the second network element node, so that the second network element node stops performing resource configuration for the UE; or receiving a speed comparison result sent by the UE, sending a handover indication message to the controller, and forwarding the handover indication message to the UE, so that the UE is handed over to the first network element node; and sending a configuration stop indication to the second network element node, so that the second network element node stops performing resource configuration for the UE.

A third aspect of the present invention provides a handover processing method, including:

receiving a second handover trigger message sent by a controller; and notifying, according to the second handover trigger message, user equipment UE to be handed over from a first network element node to the second network element node.

With reference to the third aspect of the present invention, in a first possible implementation manner, the second handover trigger message is a scheduling message; and the notifying, according to the second handover trigger message, user equipment UE to be handed over from a first network element node to the second network element node includes:

forwarding the scheduling message to the UE, so that the UE is handed over from the first network element node to the second network element node according to the scheduling message.

With reference to the third aspect of the present invention, in a second possible implementation manner, the second handover trigger message is a handover request message, and the handover request message includes a first identifier of the UE, where the first identifier uniquely identifies a sequence number of the UE in the first network element node; and the notifying, according to the second handover trigger message, user equipment UE to be handed over from a first network element node to the second network element node includes:

sending the handover response message to the controller, so that the controller forwards the handover response message to the UE, so that the UE is handed over from the first network element node to the second network element node, where the handover response message includes the first identifier of the UE and a second identifier of the UE, where the second identifier uniquely identifies a sequence number of the UE in the second network element node.

With reference to the third aspect of the present invention and the second possible implementation manner of the third aspect, in a third possible implementation manner, the second handover trigger message is a handover request message, and the handover request message includes a third identifier of the UE and a fourth identifier, where the third identifier uniquely identifies a sequence number of the UE in the controller, and the fourth identifier is an identity of the first network element node; and the notifying, according to the second handover trigger message, user equipment UE to be handed over from a first network element node to the second network element node includes:

sending the handover response message to the controller, so that the controller forwards the handover response message to the UE, so that the UE is handed over from the first network element node to the second network element node, where the handover response message includes the third identifier of the UE, the fourth identifier, and the second identifier of the UE, where the second identifier uniquely identifies the sequence number of the UE in the second network element node.

With reference to the third aspect of the present invention, the second possible implementation manner of the third aspect, and the third possible implementation manner of the third aspect, in a fourth possible implementation manner, the second handover trigger message is a handover request message, and the handover request message includes the first identifier and the third identifier of the UE;

the notifying, according to the second handover trigger message, user equipment UE to be handed over from a first network element node to the second network element node includes:

sending the handover response message to the controller, so that the controller forwards the handover response message to the UE, so that the UE is handed over from the first network element node to the second network element node, where the handover response message includes the first identifier and the third identifier of the UE and the second identifier of the UE;

after the receiving, by using a direct backhaul, a second handover trigger message sent by a controller, the method further includes:

sending a forward relocation request to a network element node of another mode; and before the sending a handover response message to the controller by using a direct backhaul, the method further includes:

receiving a forward relocation response sent by the heterogeneous network element node.

With reference to the third aspect of the present invention and the implementation manners of the third aspect, in a fifth possible implementation manner, the method further includes:

acquiring a real-time movement speed of the UE, and comparing the real-time movement speed with a threshold; and if the real-time movement speed is greater than or equal to the threshold, sending a handover indication message to the controller, and forwarding the handover indication message to the UE, so that the UE is handed over to the second network element node; and sending a configuration stop indication to the first network element node, so that the first network element node stops performing resource configuration for the UE; or receiving a speed comparison result sent by the UE, sending a handover indication message to the controller, and forwarding the handover indication message to the UE, so that the UE is handed over to the second network element node; and sending a configuration stop indication to the first network element node, so that the first network element node stops performing resource configuration for the UE.

A fourth aspect of the present invention provides a controller, including:

a receiving module, configured to receive a first handover trigger message sent by a first network element node; and a sending module, configured to send a second handover trigger message to a second network element node according to the first handover trigger message, so that the second network element node hands over user equipment UE from the first network element node to the second network element node according to the second handover trigger message.

With reference to the fourth aspect of the present invention, in a first possible implementation manner, the first handover trigger message is a measurement report;

the receiving module is specifically configured to receive the measurement report sent by the first network element node; and the sending module is further configured to: after the receiving module receives the measurement report sent by the first network element node, send a stop command message to the first network element node, so that the first network element node stops scheduling for the UE.

With reference to the fourth aspect of the present invention, in a second possible implementation manner, the first handover trigger message is a handover request message;

the receiving module is specifically configured to receive the handover request message sent by the first network element node; and the sending module is further configured to: after the receiving module receives the handover request message sent by the first network element node, send a stop command message to the first network element node, so that the first network element node stops scheduling for the UE.

With reference to the fourth aspect of the present invention, the first possible implementation manner of the fourth aspect, and the second possible implementation manner of the fourth aspect, in a third possible implementation manner, the second handover trigger message is a scheduling message; and the sending module is specifically configured to send the scheduling message to the second network element node, so that the second network element node forwards the scheduling message to the UE to complete the handover, where the scheduling message includes resource assignment information, a modulation and coding message, codebook information, and power control information.

With reference to the fourth aspect of the present invention, in a fourth possible implementation manner, the first handover trigger message is a measurement report;

the receiving module is specifically configured to receive the measurement report sent by the first network element node; and a determining module is configured to: after the receiving module receives the measurement report sent by the first network element node, determine, according to the measurement report, to hand over the UE to the second network element node.

With reference to the fourth aspect of the present invention and the fourth possible implementation manner of the fourth aspect, in a fifth possible implementation manner, the second handover trigger message is a handover request message;

the sending module is specifically configured to send the handover request message to the second network element node, where the handover request message includes a first identifier of the UE, where the first identifier uniquely identifies a sequence number of the UE in the first network element node;

the receiving module is configured to: after the sending module sends the handover request message to the second network element node, receive a handover response message sent by the second network element node, where the handover response message includes the first identifier of the UE and a second identifier of the UE, where the second identifier uniquely identifies a sequence number of the UE in the second network element node; and the sending module is further configured to forward the handover response message to the first network element node, so that the first network element node forwards a handover command to the UE to complete the handover.

With reference to the fourth aspect of the present invention and the fourth possible implementation manner of the fourth aspect, in a sixth possible implementation manner, the second handover trigger message is a handover request message;

the sending module is specifically configured to send the handover request message to the second network element node, where the handover request message includes a third identifier of the UE and a fourth identifier, where the third identifier uniquely identifies a sequence number of the UE in the controller, and the fourth identifier is an identity of the first network element node;

the receiving module is configured to: after the sending module sends the handover request message to the second network element node, receive a handover response message sent by the second network element node, where the handover response message includes the third identifier of the UE, the fourth identifier, and the second identifier of the UE, where the second identifier uniquely identifies a sequence number of the UE in the second network element node; and the sending module is further configured to forward the handover response message to the first network element node, so that the first network element node forwards a handover command to the UE to complete the handover.

With reference to the fourth aspect of the present invention, the fourth possible implementation manner of the fourth aspect, the fifth possible implementation manner of the fourth aspect, and the sixth possible implementation manner of the fourth aspect, in a seventh possible implementation manner, the second handover trigger message is a handover request message;

the sending module is specifically configured to send the handover request message to the second network element node, where the handover request message includes the first identifier and the third identifier of the UE;

the receiving module is configured to: after the sending module sends the handover request message to the second network element node, receive a handover response message sent by the second network element node, where the handover response message includes the first identifier and the third identifier of the UE and the second identifier of the UE; and the sending module is further configured to forward the handover response message to the first network element node, so that the first network element node forwards a handover command to the UE to complete the handover.

With reference to the fourth aspect of the present invention and the implementation manners of the fourth aspect, in an eighth possible implementation manner:

the receiving module is further configured to: if the first network element node is a macro base station, receive a handover indication message sent by the first network element node; and the sending module is further configured to forward the handover indication message to the UE, so that the UE is handed over to the first network element node; or the receiving module is further configured to: if the second network element node is a macro base station, receive a handover indication message sent by the second network element node; and the sending module is further configured to forward the handover indication message to the UE, so that the UE is handed over to the second network element node.

A fifth aspect of the present invention provides a first network element node, including:

a receiving module, configured to receive a measurement report sent by user equipment UE; and a sending module, configured to send a first handover trigger message to a controller according to the measurement report, so that the controller sends a second handover trigger message to a second network element node according to the first handover trigger message, so as to hand over the UE from the first network element node to the second network element node.

With reference to the fifth aspect of the present invention, in a first possible implementation manner, the first handover trigger message is the measurement report; and the sending module is specifically configured to forward the measurement report to the controller.

With reference to the fifth aspect of the present invention, in a second possible implementation manner, the first handover trigger message is a handover request message;

a determining module is configured to determine, according to the measurement report, to hand over the UE to the second network element node; and the sending module is specifically configured to send the handover request message to the controller.

With reference to the first possible implementation manner of the fifth aspect of the present invention and the second possible implementation manner of the fifth aspect, in a third possible implementation manner, the receiving module is further configured to: after the sending module sends the first handover trigger message to the controller according to the measurement report, receive a stop command message sent by the controller, and stop scheduling for the UE according to the stop command message.

With reference to the fifth aspect of the present invention, in a fourth possible implementation manner, the first handover trigger message is the measurement report;

the sending module is specifically configured to forward the measurement report to the controller;

the receiving module is specifically configured to: after the sending module forwards the measurement report to the controller, receive a handover response message sent by the controller, where the handover response message includes the first identifier of the UE and a second identifier of the UE, where the first identifier uniquely identifies a sequence number of the UE in the first network element node, and the second identifier uniquely identifies a sequence number of the UE in the second network element node; and the sending module is further configured to send a handover command to the UE according to the handover response message, so that the UE is handed over from the first network element node to the second network element node according to the handover command.

With reference to the fourth possible implementation manner of the fifth aspect of the present invention, in a fifth possible implementation manner, the first handover trigger message is the measurement report;

the sending module is specifically configured to forward the measurement report to the controller;

the receiving module is specifically configured to: after the sending module forwards the measurement report to the controller, receive a handover response message sent by the controller, where the handover response message includes the third identifier of the UE, the fourth identifier, and the second identifier of the UE, where the third identifier uniquely identifies a sequence number of the UE in the controller, and the fourth identifier is an identity of the first network element node; and the sending module is further configured to send a handover command to the UE according to the handover response message, so that the UE is handed over from the first network element node to the second network element node according to the handover command.

With reference to the fourth possible implementation manner of the fifth aspect of the present invention and the fifth possible implementation manner of the fifth aspect, in a sixth possible implementation manner, the first handover trigger message is the measurement report;

the sending module is specifically configured to forward the measurement report to the controller;

the receiving module is specifically configured to: after the sending module forwards the measurement report to the controller, receive a handover response message sent by the controller, where the handover response message includes the first identifier and the third identifier of the UE and the second identifier of the UE; and the sending module is further configured to send a handover command to the UE according to the handover response message, so that the UE is handed over from the first network element node to the second network element node according to the handover command.

With reference to the fifth aspect of the present invention and the possible implementation manners of the fifth aspect, in a seventh possible implementation manner, the first network element node further includes:

an acquiring module, configured to acquire a real-time movement speed of the UE, and compare the real-time movement speed with a threshold, where, if the real-time movement speed is greater than or equal to the threshold, the sending module is further configured to send a handover indication message to the controller, and forward the handover indication message to the UE, so that the UE is handed over to the first network element node; and the sending module is further configured to send a configuration stop indication to the second network element node, so that the second network element node stops performing resource configuration for the UE; or the receiving module is further configured to receive a speed comparison result sent by the UE, send a handover indication message to the controller, and forward the handover indication message to the UE, so that the UE is handed over to the first network element node; and the sending module is further configured to send a configuration stop indication to the second network element node, so that the second network element node stops performing resource configuration for the UE.

A sixth aspect of the present invention provides a second network element node, including:

a receiving module, configured to receive a second handover trigger message sent by a controller; and a notification module, configured to notify, according to the second handover trigger message, user equipment UE to be handed over from a first network element node to the second network element node.

With reference to the sixth aspect of the present invention, in a first possible implementation manner, the second handover trigger message is a scheduling message;

the notification module is specifically configured to forward the scheduling message to the UE, so that the UE is handed over from the first network element node to the second network element node according to the scheduling message.

With reference to the sixth aspect of the present invention, in a second possible implementation manner, the second handover trigger message is a handover request message, and the handover request message includes a first identifier of the UE, where the first identifier uniquely identifies a sequence number of the UE in the first network element node; and the notification module is specifically configured to send the handover response message to the controller, so that the controller forwards the handover response message to the UE, so that the UE is handed over from the first network element node to the second network element node, where the handover response message includes the first identifier of the UE and a second identifier of the UE, where the second identifier uniquely identifies a sequence number of the UE in the second network element node.

With reference to the sixth aspect of the present invention and the second possible implementation manner of the sixth aspect, in a third possible implementation manner, the second handover trigger message is a handover request message, and the handover request message includes a third identifier of the UE and a fourth identifier, where the third identifier uniquely identifies a sequence number of the UE in the controller, and the fourth identifier is an identity of the first network element node; and the notification module is specifically configured to send the handover response message to the controller, so that the controller forwards the handover response message to the UE, so that the UE is handed over from the first network element node to the second network element node, where the handover response message includes the third identifier of the UE, the fourth identifier, and the second identifier of the UE, where the second identifier uniquely identifies the sequence number of the UE in the second network element node.

With reference to the sixth aspect of the present invention, the second possible implementation manner of the sixth aspect, and the third possible implementation manner of the sixth aspect, in a fourth possible implementation manner, the second handover trigger message is a handover request message, and the handover request message includes the first identifier and the third identifier of the UE;

the notification module is configured to send the handover response message to the controller, so that the controller forwards the handover response message to the UE, so that the UE is handed over from the first network element node to the second network element node, where the handover response message includes the first identifier and the third identifier of the UE and the second identifier of the UE;

the second network element node further includes:

a sending module, configured to: after the receiving module receives the second handover trigger message sent by the controller, send a forward relocation request to a network element node of another mode; and the receiving module is further configured to: before the notification module sends the handover response message to the controller, receive a forward relocation response sent by the heterogeneous network element node.

With reference to the sixth aspect of the present invention and the implementation manners of the sixth aspect, in a fifth possible implementation manner, the second network element node further includes:

an acquiring module, configured to acquire a real-time movement speed of the UE, and compare the real-time movement speed with a threshold, where, if the real-time movement speed is greater than or equal to the threshold, the notification module is configured to send a handover indication message to the controller, and forward the handover indication message to the UE, so that the UE is handed over to the second network element node; and the notification module is further configured to send a configuration stop indication to the first network element node, so that the first network element node stops performing resource configuration for the UE; or the receiving module is further configured to receive a speed comparison result sent by the UE;

the notification module is configured to send a handover indication message to the controller, and forward the handover indication message to the UE, so that the UE is handed over to the second network element node; and the notification module is further configured to send a configuration stop indication to the first network element node, so that the first network element node stops performing resource configuration for the UE.

A sixth aspect of the present invention provides a handover processing system, including: the foregoing controller according to the fourth aspect and the possible implementation manners of the fourth aspect; the foregoing first network element node according to the fifth aspect and the possible implementation manners of the fifth aspect; and the foregoing second network element node according to the sixth aspect and the possible implementation manners of the sixth aspect.

Embodiments of the present invention provide a handover processing method, apparatus, and system. The handover processing method includes: receiving a first handover trigger message sent by a first network element node; and sending a second handover trigger message to a second network element node according to the first handover trigger message, so that the second network element node hands over user equipment UE from the first network element node to the second network element node according to the second handover trigger message. Handover between small cells or between a small cell and a macro cell is implemented, and because a controller is used to perform handover, a handover delay is effectively reduced, and network performance is improved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some rather than all of the embodiments of the present invention. All other embodiments obtained by persons of ordinary skill in the art based on the embodiments of the present invention without creative efforts shall fall within the protection scope of the present invention.

Figure 1:
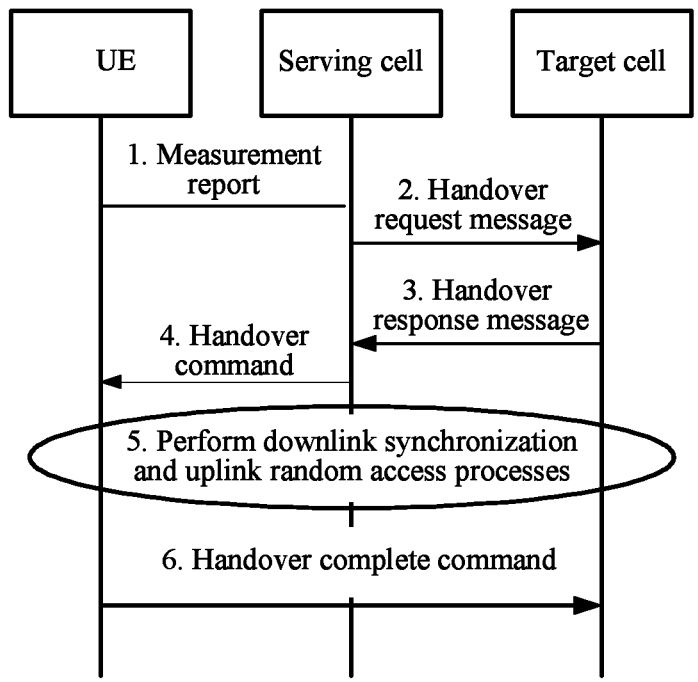
FIG. 1 is a schematic diagram of signaling exchange in a handover processing method in the prior art.

FIG. 1 is a schematic diagram of signaling exchange in a handover processing method in the prior art. Referring to FIG. 1, the prior art includes the following steps:

Step 1: User equipment (UE for short) sends a measurement report to a serving cell.

Step 2: A serving small cell sends a handover request message to a target cell, and the target cell performs admission control.

Step 3: The target cell sends a handover response message to the serving cell.

Step 4: The serving cell sends a handover command to the UE.

Step 5: The UE performs downlink synchronization and uplink random access (RA for short) processes with respect to the target cell.

Step 6: The UE sends a handover complete command to the target cell.

Referring to FIG. 1, in the prior art, for network deployment without a controller, if UE is to be handed over between small cells, the handover is implemented by means of a conventional handover procedure. Because, a small cell (the serving cell) and a small cell (the target cell) are in a wireless environment, and an interface therebetween is x2, the handover request message and the handover response message are subject to relatively large delays.

Figure 2:
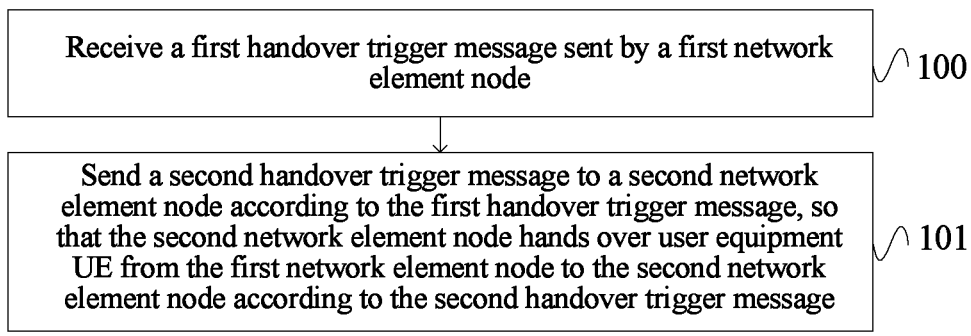
FIG. 2 is a schematic flowchart of a handover processing method according to Embodiment 1 of the present invention.

FIG. 2 is a schematic flowchart of a handover processing method according to Embodiment 1 of the present invention, where an executing body is a controller. For a network in which small cells are intensively deployed, a controller may be additionally deployed. The controller is directly connected to a small cell managed by the controller, and the controller is directly connected to a base station that is controlled by the controller. As shown in FIG. 2, the handover processing method includes:

Step 100: Receive a first handover trigger message sent by a first network element node.

Step 101: Send a second handover trigger message to a second network element node according to the first handover trigger message, so that the second network element node hands over user equipment UE from the first network element node to the second network element node according to the second handover trigger message.

According to the handover processing method provided in this embodiment, a controller receives a first handover trigger message sent by a first network element node; and then, the controller sends a second handover trigger message to a second network element node according to the first handover trigger message, so that the second network element node hands over user equipment UE from the first network element node to the second network element node according to the second handover trigger message. Handover between small cells or between a small cell and a macro cell is implemented, and because a controller is used to perform handover, a handover delay is effectively reduced, and network performance is improved.

For the solution in Embodiment 1, when the executing body thereof, the controller, has a scheduling function, a first possible implementation manner specifically includes:

The first handover trigger message in step 100 in FIG. 2 is a measurement report.

Therefore, further, step 100 in FIG. 2 specifically includes:

receiving the measurement report sent by the first network element node.

After step 100 in FIG. 2, the method further includes:

sending a stop command message to the first network element node, so that the first network element node stops scheduling for the UE.

For the solution in Embodiment 1, when the first network element node has a handover decision function, a second possible implementation manner specifically includes:

The first handover trigger message in step 100 in FIG. 2 is a handover request message.

Therefore, step 100 specifically includes:

receiving the handover request message sent by the first network element node.

Specifically, when the first network element node receives a measurement report sent by the UE, because the first network element node has the handover decision function, the first network element node decides according to the measurement report, and if the first network element node decides to hand over the UE to the second network element node, the first network element node sends the handover request message to the controller.

After step 100 in FIG. 2, the method includes:

sending a stop command message to the first network element node, so that the first network element node stops scheduling for the UE.

Further, for the foregoing two possible implementation manners, the second handover trigger message in step 101 is a scheduling message.

Therefore, step 101 in FIG. 2 specifically includes:

sending the scheduling message to the second network element node, so that the second network element node forwards the scheduling message to the UE to complete the handover.

Specifically, the scheduling message includes resource assignment information, a modulation and coding message, codebook information, and power control information.

Further, for the solution in Embodiment 1, when the controller has a handover decision function, a third possible implementation manner specifically includes:

The first handover trigger message in step 100 in FIG. 2 is a measurement report.

Therefore, step 100 in FIG. 2 specifically includes:

receiving the measurement report sent by the first network element node.

After step 100 in FIG. 2, the method includes:

determining, according to the measurement report, to hand over the UE to the second network element node.

Further, based on the third possible implementation manner, the second handover trigger message in step 101 in FIG. 2 is a handover request message.

In this case, step 101 in FIG. 2 specifically includes:

sending the handover request message to the second network element node, where the handover request message includes a first identifier of the UE.

Specifically, an example in which the first network element node (a serving cell) is an AP of a small cell, and the second network element node (a target cell) is an AP of another small cell is used, and the first identifier uniquely identifies a sequence number of the UE in the first network element node. Referring to the following Table 1, Table 1 shows information elements included in the handover request message based on the third possible implementation manner. The first identifier of the UE is an Older AP UE XmAP index, and the first identifier of the UE is a newly added information element.

TABLE 1

| IE/Group Name | Presence |
| --- | --- |
| Message Type | M |
| Older AP UE XmAP index | M |
| Cause | M |
| Target Cell ID | M |
| GUMMEI | M |
| UE Context Information | |
|     MME UE S1AP ID | M |
|     UE Security Capabilities | M |
|     AS Security Information | M |
|     UE Aggregate Maximum Bit Rate | M |
|     Subscriber Profile ID for RAT/Frequency priority | O |
|     E-RABs To Be Setup List | |
|         E-RABs To Be Setup Item | |
|             E-RAB ID | M |
|             E-RAB Level QoS Parameters | M |
|             DL Forwarding | O |
|             UL GTP Tunnel Endpoint | M |
| RRC Context | M |
| Handover Restriction List | O |
| Location Reporting Information | O |
| UE History Information | M |
| Trace Activation | O |
| SRVCC Operation Possible | O |

After step 101 in FIG. 2, the method includes:

receiving a handover response message sent by the second network element node, where the handover response message includes the first identifier of the UE and a second identifier of the UE.

The second identifier uniquely identifies a sequence number of the UE in the second network element node. Referring to the following Table 2, Table 2 shows information elements included in the handover response message based on the third possible implementation manner. The second identifier of the UE is a New AP UE XmAP index, and the second identifier of the UE is a newly added information element.

TABLE 2

| IE/Group Name | Presence | Range |
|---|---|---|
| Message Type | M | |
| | M | |
| Older AP UE XmAP index | M | |
| New AP UE XmAP index | M | |
| E-RABs Admitted List | | 1 |
| E-RABs Admitted Item | | 1 to <maxnoof Bearers> |
| E-RAB ID | M | |
| UL GTP Tunnel Endpoint | O | |
| DL GTP Tunnel Endpoint | O | |
| E-RABs Not Admitted List | O | |
| Target eNB To Source eNB Transparent Container | M | |
| Criticality Diagnostics | O | |

The handover response message is forwarded to the first network element node, so that the first network element node forwards a handover command to the UE to complete the handover.

Further, for the solution in Embodiment 1, when the controller has a handover decision function, and a handover procedure involves a scenario of handover from a small cell to a macro cell or from a macro cell to a small cell, an example of handover from a small cell to a macro cell is used for description below, and a fourth possible implementation manner specifically includes:

The second handover trigger message in step 101 in FIG. 2 is a handover request message; and the sending a second handover trigger message to a second network element node includes:

sending the handover request message to the second network element node, where the handover request message includes a third identifier of the UE and a fourth identifier.

Specifically, the first network element node is an AP of a small cell, the second network element node is an evolved Node B (eNB for short) of a macro cell, the third identifier uniquely identifies a sequence number of the UE in the controller, and the fourth identifier is an identity of the first network element node. Referring to the following Table 3, Table 3 shows information elements included in the handover request message based on the fourth possible implementation manner. The third identifier of the UE is an Old controller UE XnAP ID, the fourth identifier is an Older AP index, and the third identifier and the fourth identifier are both newly added information elements.

TABLE 3

| IE/Group Name | Presence |
|---|---|
| Message Type | M |
| Old controller UE XnAP ID | M |
| Older AP index | M |
| Cause | M |
| Target Cell ID | M |

TABLE 3-continued

| IE/Group Name | Presence |
|---|---|
| GUMMEI | M |
| UE Context Information | |
| MME UE S1AP ID | M |
| UE Security Capabilities | M |
| AS Security Information | M |
| UE Aggregate Maximum Bit Rate | M |
| Subscriber Profile ID for RAT/Frequency priority | O |
| E-RABs To Be Setup List | |
| E-RABs To Be Setup Item | |
| E-RAB ID | M |
| E-RAB Level QoS Parameters | M |
| DL Forwarding | O |
| UL GTP Tunnel Endpoint | M |
| RRC Context | M |
| Handover Restriction List | O |
| Location Reporting Information | O |
| UE History Information | M |
| Trace Activation | O |
| SRVCC Operation Possible | O |

After the sending the handover request message to the second network element node, the method includes:

receiving a handover response message sent by the second network element node, where the handover response message includes the third identifier of the UE, the fourth identifier, and a second identifier of the UE.

The second identifier uniquely identifies a sequence number of the UE in the second network element node. Referring to the following Table 4, Table 4 shows information elements included in the handover response message based on the fourth possible implementation manner. The third identifier of the UE is an Old controller UE XnAP ID, the fourth identifier is an Older AP index, the second identifier of the UE is a New eNB UE XnAP ID, and the second identifier and the third identifier of the UE and the fourth identifier are all newly added information elements.

TABLE 4

| IE/Group Name | Presence | Range |
|---|---|---|
| Message Type | M | |
| Old controller UE XnAP ID | M | |
| Older AP index | M | |
| New eNB UE XnAP ID | M | |
| E-RABs Admitted List | | 1 |
| E-RABs Admitted Item | | 1 to <maxnoof Bearers> |
| E-RAB ID | M | |
| UL GTP Tunnel Endpoint | O | |
| DL GTP Tunnel Endpoint | O | |
| E-RABs Not Admitted List | O | |
| Target eNB To Source eNB Transparent Container | M | |
| Criticality Diagnostics | O | |

The handover response message is forwarded to the first network element node, so that the first network element node forwards a handover command to the UE to complete the handover.

Further, for the solution in Embodiment 1, when the controller has a handover decision function, and a handover procedure involves a scenario of handover from a small cell to a system of another mode or from a system of another mode to a small cell, an example of handover from a small cell to a system of another mode is used for description below, and a fifth possible implementation manner specifically includes:

The second handover trigger message in step 101 in FIG. 2 is a handover request message; and the sending a second handover trigger message to a second network element node includes:

sending the handover request message to the second network element node, where the handover request message includes a first identifier and a third identifier of the UE.

Specifically, referring to the following Table 5, Table 5 shows information elements included in the handover request message based on the fifth possible implementation manner. The first identifier of the UE is an Older AP UE XnAP index, the third identifier is an Old controller UE XnAP ID, and the first identifier and the third identifier of the UE are both newly added information elements.

TABLE 5

| IE/Group Name | Presence |
|---|---|
| Message Type | M |
| Old controller UE XnAP ID | M |
| Older AP UE XnAP index | M |
| Cause | M |
| Target Cell ID | M |
| GUMMEI | M |
| UE Context Information | |
|   MME UE S1AP ID | M |
|   UE Security Capabilities | M |
|   AS Security Information | M |
|   UE Aggregate Maximum Bit Rate | M |
|   Subscriber Profile ID for RAT/Frequency priority | O |
|   E-RABs To Be Setup List | |
|     E-RABs To Be Setup Item | |
|       E-RAB ID | M |
|       E-RAB Level QoS Parameters | M |
|       DL Forwarding | O |
|       UL GTP Tunnel Endpoint | M |
|   RRC Context | M |
|   Handover Restriction List | O |
|   Location Reporting Information | O |
| UE History Information | M |
| Trace Activation | O |
| SRVCC Operation Possible | O |

After the sending the handover request message to the second network element node, the method includes:

receiving a handover response message sent by the second network element node, where the handover response message includes the first identifier and the third identifier of the UE and a second identifier of the UE.

Specifically, referring to the following Table 6, Table 6 shows information elements included in the handover response message based on the fifth possible implementation manner. The first identifier of the UE is an Older AP UE XnAP index, the third identifier is an Old controller UE XnAP ID, the second identifier of the UE is a New eNB UE XnAP ID, and the first identifier, the third identifier, and the second identifier of the UE are all newly added information elements.

TABLE 6

| IE/Group Name | Presence | Range |
|---|---|---|
| Message Type | M | |
| Old controller UE XnAP ID | M | |
| Older AP UE XnAP index | M | |
| New eNB UE XnAP ID | M | |
| E-RABs Admitted List | | 1 |
|   E-RABs Admitted Item | | 1 to <maxnoof Bearers> |

TABLE 6-continued

| IE/Group Name | Presence | Range |
|---|---|---|
|     E-RAB ID | M | |
|     UL GTP Tunnel Endpoint | O | |
|     DL GTP Tunnel Endpoint | O | |
| E-RABs Not Admitted List | O | |
| Target eNB To Source eNB Transparent Container | M | |
| Criticality Diagnostics | O | |

The handover response message is forwarded to the first network element node, so that the first network element node forwards a handover command to the UE to complete the handover.

For the foregoing Embodiment 1 and the possible implementation manners, for a scenario in which the UE needs to be directly handed over to an eNB of a macro cell when a movement speed of the UE exceeds a threshold, the scenario is described below by using a sixth possible implementation manner. There are specifically two possible cases for the manner Case 1: If the first network element node is a macro base station, a handover indication message sent by the first network element node is received, and the handover indication message is forwarded to the UE, so that the UE is handed over to the first network element node.

Alternatively, case 2: If the second network element node is a macro base station, a handover indication message sent by the second network element node is received, and the handover indication message is forwarded to the UE, so that the UE is handed over to the second network element node.

Figure 3:
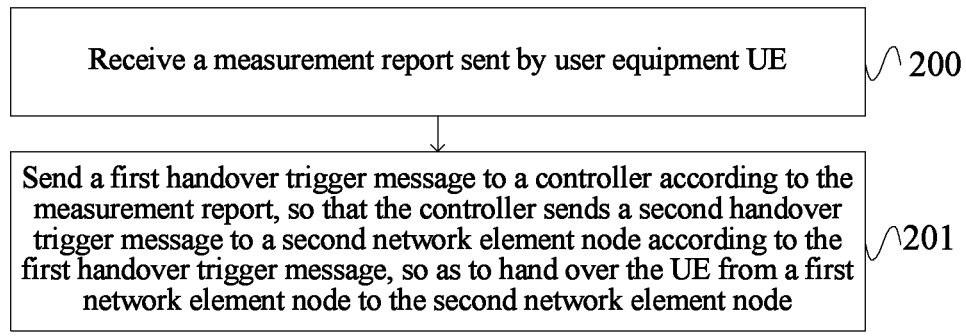
FIG. 3 is a schematic flowchart of a handover processing method according to Embodiment 2 of the present invention.

FIG. 3 is a schematic flowchart of a handover processing method according to Embodiment 2 of the present invention, where an executing body is a first network element node. As shown in FIG. 3, the handover processing method includes:

Step 200: Receive a measurement report sent by user equipment UE.

Step 201: Send a first handover trigger message to a controller according to the measurement report, so that the controller sends a second handover trigger message to a second network element node according to the first handover trigger message, so as to hand over the UE from a first network element node to the second network element node.

According to the handover processing method provided in this embodiment, a first network element node receives a measurement report sent by user equipment UE; and then, the first network element node sends a first handover trigger message to a controller according to the measurement report, so that the controller sends a second handover trigger message to a second network element node according to the first handover trigger message, so as to hand over the UE from the first network element node to the second network element node. Handover between small cells or between a small cell and a macro cell is implemented by using a controller, and because the controller is used to perform handover, a handover delay is effectively reduced, and network performance is improved.

Because a manner of handover by using a controller is used, a handover delay is effectively reduced, and network performance is improved.

For the solution in Embodiment 2, when the controller has a scheduling function, a first possible implementation manner specifically includes:

The first handover trigger message in step 201 in FIG. 3 is the measurement report.

Therefore, step 201 in FIG. 3 specifically includes:
forwarding the measurement report to the controller.

For the solution in Embodiment 2, when the executing body: the first network element node has a handover decision function, a second possible implementation manner specifically includes:

The first handover trigger message in step 201 in FIG. 3 is a handover request message.

Therefore, step 201 in FIG. 3 specifically includes:
determining, according to the measurement report, to hand over the UE to the second network element node; and
sending the handover request message to the controller.

With reference to the foregoing two possible implementation manners, after step 201 in FIG. 3, the method further includes:
receiving a stop command message sent by the controller, and stopping scheduling for the UE according to the stop command message.

Further, for the solution in Embodiment 2, when the controller has a handover decision function, a third possible implementation manner specifically includes:

The first handover trigger message in step 201 in FIG. 3 is the measurement report.

Therefore, step 201 in FIG. 3 specifically includes:
forwarding the measurement report to the controller.

After step 201 in FIG. 3, the method further includes:
receiving a handover response message sent by the controller, where the handover response message includes a first identifier of the UE and a second identifier of the UE.

The first identifier uniquely identifies a sequence number of the UE in the first network element node, and the second identifier uniquely identifies a sequence number of the UE in the second network element node. For details, reference may be made to Table 2 above, and details are not described herein again.

A handover command is sent to the UE according to the handover response message, so that the UE is handed over from the first network element node to the second network element node according to the handover command.

Further, for the solution in Embodiment 2, when the controller has a handover decision function, and a handover procedure involves a scenario of handover from a small cell to a macro cell or from a macro cell to a small cell, an example of handover from a small cell to a macro cell is used for description below, and a fourth possible implementation manner specifically includes:

The first handover trigger message in step 201 in FIG. 3 is the measurement report.

Therefore, step 201 in FIG. 3 specifically includes:
forwarding the measurement report to the controller.

After step 201 in FIG. 3, the method further includes:
receiving a handover response message sent by the controller, where the handover response message includes a third identifier of the UE, a fourth identifier, and a second identifier of the UE.

The third identifier uniquely identifies a sequence number of the UE in the controller, and the fourth identifier is an identity of the first network element node. For details, reference may be made to Table 4 above, and details are not described herein again.

A handover command is sent to the UE according to the handover response message, so that the UE is handed over from the first network element node to the second network element node according to the handover command.

Further, for the solution in Embodiment 2, when the controller has a handover decision function, and a handover procedure involves a scenario of handover from a small cell to a system of another mode or from a system of another mode to a small cell, an example of handover from a small cell to a system of another mode is used for description below, and a fifth possible implementation manner specifically includes:

The first handover trigger message in step 201 in FIG. 3 is the measurement report.

Therefore, step 201 in FIG. 3 specifically includes:
forwarding the measurement report to the controller.

After the forwarding the measurement report to the controller, the method further includes:
receiving a handover response message sent by the controller, where the handover response message includes a first identifier and a third identifier of the UE and a second identifier of the UE.

For details, reference may be made to Table 6 above, and details are not described herein again.

A handover command is sent to the UE according to the handover response message, so that the UE is handed over from the first network element node to the second network element node according to the handover command.

For the foregoing Embodiment 2 and the possible implementation manners, for a scenario in which the UE needs to be directly handed over to an eNB of a macro cell when a movement speed of the UE exceeds a threshold, the scenario is described below by using a sixth possible implementation manner. There are specifically two possible cases for the manner:

Case 1: A real-time movement speed of the UE is acquired, and the real-time movement speed is compared with a threshold; and if the real-time movement speed is greater than or equal to the threshold, a handover indication message is sent to the controller, and the handover indication message is forward to the UE, so that the UE is handed over to the first network element node; and a configuration stop indication is sent to the second network element node, so that the second network element node stops performing resource configuration for the UE.

Specifically, when the first network element node is a macro base station, the solution in the case 1 is performed.

Alternatively, case 2: A speed comparison result sent by the UE is received, a handover indication message is sent to the controller, and a handover indication message is forwarded to the UE, so that the UE is handed over to the first network element node; and a configuration stop indication is sent to the second network element node, so that the second network element node stops performing resource configuration for the UE.

Specifically, if the second network element node is a macro base station, the solution in the case 2 is performed.

Figure 4:
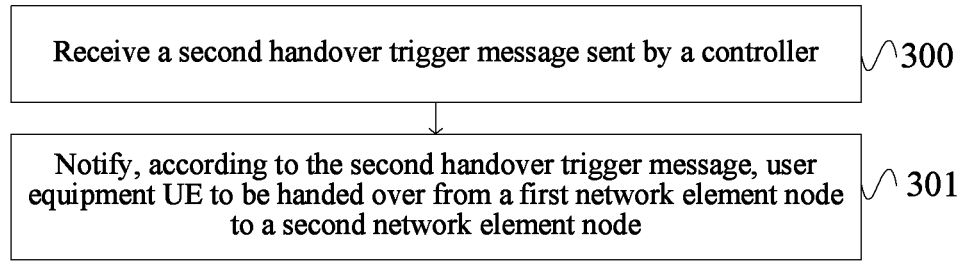
FIG. 4 is a schematic flowchart of a handover processing method according to Embodiment 3 of the present invention.

FIG. 4 is a schematic flowchart of a handover processing method according to Embodiment 3 of the present invention, where an executing body is a second network element node (a target cell). As shown in FIG. 4, the handover processing method includes:

Step 300: Receive a second handover trigger message sent by a controller.

Step 301: Notify, according to the second handover trigger message, user equipment UE to be handed over from a first network element node to a second network element node.

According to the handover processing method provided in this embodiment, a second network element node receives a second handover trigger message sent by a controller; and then, the second network element node notifies, according to the second handover trigger message, user equipment UE to be handed over from a first network element node to the second network element node. Handover between small cells or between a small cell and a macro cell is implemented, and because a controller is used to perform handover, a handover delay is effectively reduced, and network performance is improved.

For the solution in Embodiment 3, when the controller has a scheduling function, a first possible implementation manner specifically includes:

The second handover trigger message in step 300 in FIG. 4 is a scheduling message.

Therefore, step 300 in FIG. 4 specifically includes:

forwarding the scheduling message to the UE, so that the UE is handed over from the first network element node to the second network element node according to the scheduling message.

For the solution in Embodiment 3, when the first network element node has a handover decision function, a second possible implementation manner specifically includes:

The second handover trigger message in step 300 in FIG. 4 is a handover request message, and the handover request message includes a first identifier of the UE.

The first identifier uniquely identifies a sequence number of the UE in the first network element node. For details, refer to Table 1 above, and details are not described herein again.

Therefore, step 301 in FIG. 4 specifically includes:

sending a handover response message to the controller, so that the controller forwards the handover response message to the UE, so that the UE is handed over from the first network element node to the second network element node.

The handover response message includes the first identifier of the UE and a second identifier of the UE.

The second identifier uniquely identifies a sequence number of the UE in the second network element node. For details, refer to Table 2 above, and details are not described herein again.

Further, for the solution in Embodiment 3, when the controller has a handover decision function, and a handover procedure involves a scenario of handover from a small cell to a macro cell or from a macro cell to a small cell, an example of handover from a small cell to a macro cell is used for description below, and a fourth possible implementation manner specifically includes:

The second handover trigger message in step 300 in FIG. 4 is a handover request message, and the handover request message includes a third identifier of the UE and a fourth identifier.

The third identifier uniquely identifies a sequence number of the UE in the controller, and the fourth identifier is an identity of the first network element node. For details, refer to Table 3 above, and details are not described herein again.

Therefore, step 301 in FIG. 4 specifically includes:

sending a handover response message to the controller, so that the controller forwards the handover response message to the UE, so that the UE is handed over from the first network element node to the second network element node.

The handover response message includes the third identifier of the UE, the fourth identifier, and a second identifier of the UE.

The second identifier uniquely identifies a sequence number of the UE in the second network element node. For details, refer to Table 4 above, and details are not described herein again.

Further, for the solution in Embodiment 3, when the controller has a handover decision function, and a handover procedure involves a scenario of handover from a small cell to a system of another mode or from a system of another mode to a small cell, an example of handover from a small cell to a system of another mode is used for description below, and a fifth possible implementation manner specifically includes:

The second handover trigger message in step 300 in FIG. 4 is a handover request message, and the handover request message includes a first identifier and a third identifier of the UE. For details, refer to Table 5 above, and details are not described herein again.

Therefore, step 301 in FIG. 4 specifically includes:

sending a handover response message to the controller, so that the controller forwards the handover response message to the UE, so that the UE is handed over from the first network element node to the second network element node.

The handover response message includes the first identifier and the third identifier of the UE and a second identifier of the UE. For details, refer to Table 6 above, and details are not described herein again.

After step 300 in FIG. 4, the method further includes:

sending a forward relocation request to a network element node of another mode;

before the sending a handover response message to the controller, the method further includes:

receiving a forward relocation response sent by a heterogeneous network element node.

For the foregoing Embodiment 3 and the possible implementation manners, for a scenario in which the UE needs to be directly handed over to an eNB of a macro cell when a movement speed of the UE exceeds a threshold, the scenario is described below by using a sixth possible implementation manner. There are specifically two possible cases for the manner:

Case 1: A real-time movement speed of the UE is acquired, and the real-time movement speed is compared with a threshold; and if the real-time movement speed is greater than or equal to the threshold, a handover indication message is sent to the controller, and the handover indication message is forward to the UE, so that the UE is handed over to the second network element node; and a configuration stop indication is sent to the first network element node, so that the first network element node stops performing resource configuration for the UE.

Specifically, when the first network element node is a macro base station, the solution in the case 1 is performed.

Case 2: A speed comparison result sent by the UE is received, a handover indication message is sent to the controller, and a handover indication message is forwarded to the UE, so that the UE is handed over to the second network element node; and a configuration stop indication is sent to the first network element node, so that the first network element node stops performing resource configuration for the UE.

Specifically, if the second network element node is a macro base station, the solution in the case 2 is performed.

The foregoing Embodiment 1 to Embodiment 3 and the possible implementation manners are described by using specific embodiments in combination with a controller, a first network element node, and a second network element node below.

Figure 5:
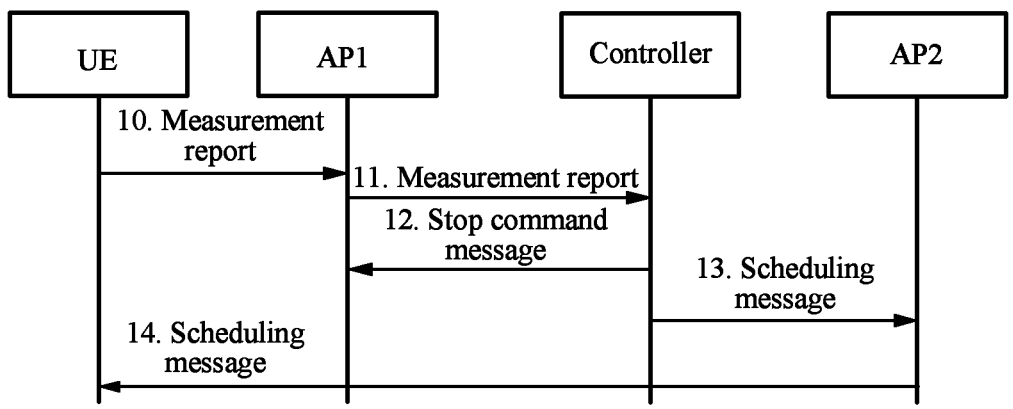
FIG. 5 is a schematic diagram of signaling exchange in a handover processing method according to Embodiment 4 of the present invention.

FIG. 5 is a schematic diagram of signaling exchange in a handover processing method according to Embodiment 4 of the present invention. Handover between small cells is used as an example below. A node of a serving cell is access point 1 (AP1 for short), and a node of a target cell is access point 2 (AP2 for short). Referring to FIG. 5, Embodiment 4 includes the following steps:

Step 10: UE sends a measurement report to AP1 (a serving cell).

Step 11: AP1 forwards the measurement report to a controller.

Specifically, an interface between AP1 and the controller is a newly defined interface; therefore, the measurement report is a new message. Because the controller manages APs of multiple small cells, the controller can learn a load status of each small cell, and the controller comprehensively considers a measurement result reported by the UE (the controller can learn signal quality or signal strength of each neighboring cell that is reported by the UE) to perform handover decision for the UE, so as to determine a target cell to which the UE is to be handed over.

Step 12: The controller sends a stop command message to AP1.

Specifically, the controller has a scheduling function, and the controller is capable of scheduling AP nodes of all small cells within a management range. Therefore, when the UE moves between AP nodes within the management range of the controller, a handover process of the UE may be changed to a scheduling process. The stop command message in step 12 is optional, for example, if VoIP traffic is transmitted, the controller needs to notify AP1 of the serving cell to stop scheduling for the UE. A format of the message may be an indication of 1 bit. If dynamic traffic is transmitted, step 12 may be omitted.

Step 13: The controller sends a scheduling message to AP2 (a target cell).

Specifically, the scheduling message includes but is not limited to resource assignment information, a modulation and coding scheme, codebook information, power control information, and the like.

Step 14: The UE receives the scheduling message forwarded by AP2.

Specifically, after the UE receives the scheduling message forwarded by AP2, the UE performs normal communication via AP2 (that is, the target cell).

Figure 6:
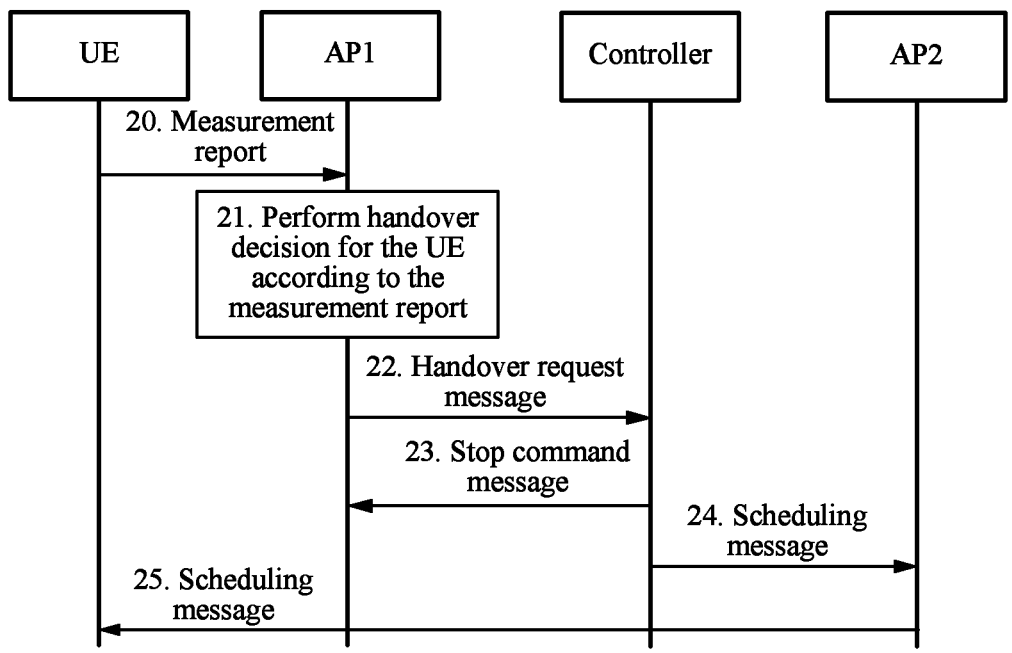
FIG. 6 is a schematic diagram of signaling exchange in a handover processing method according to Embodiment 5 of the present invention.

FIG. 6 is a schematic diagram of signaling exchange in a handover processing method according to Embodiment 5 of the present invention. Referring to FIG. 6, Embodiment 5 includes the following steps:

Step 20: UE sends a measurement report to AP1 of a small cell (a serving cell).

Step 21: AP1 performs handover decision for the UE according to the measurement report, to determine a target cell of the UE.

Step 22: AP1 sends a handover request message to a controller.

Specifically, AP1 informs the controller of a result of the handover decision, that is, the target cell. The handover request message (handover request) includes but is not limited to a target cell id. The controller obtains information about the target cell and starts a scheduling process. The controller has a scheduling function, and the controller is capable of scheduling all AP nodes within a management range. Therefore, when the UE moves between AP nodes within the management range of the controller, a handover process of the UE may be changed to a scheduling process.

Step 23: The controller sends a stop command message to AP1.

Specifically, the controller sends the stop command message to AP1. The stop command message is optional, for example, if Voice over Internet Protocol (VoIP for short) traffic is transmitted, the controller needs to notify AP1 node to stop scheduling for the UE. A format of the stop command message may be an indication of 1 bit. If dynamic traffic is transmitted, step 23 may be omitted.

Step 24: The controller sends a scheduling message to AP2 of a small cell (a target cell).

Specifically, the scheduling message includes but is not limited to resource assignment information, a modulation and coding scheme, codebook information, power control information, and the like.

Step 25: The UE receives the scheduling message forwarded by AP2.

Specifically, after the UE receives the scheduling message forwarded by AP2, the UE performs normal communication with AP2 (that is, the target cell).

In the foregoing Embodiment 4 and Embodiment 5, a handover process is changed to a scheduling process; therefore, a handover delay is reduced to a great extent, and an interruption time caused by a handover is also reduced, thereby improving a system throughput.

Figure 7:
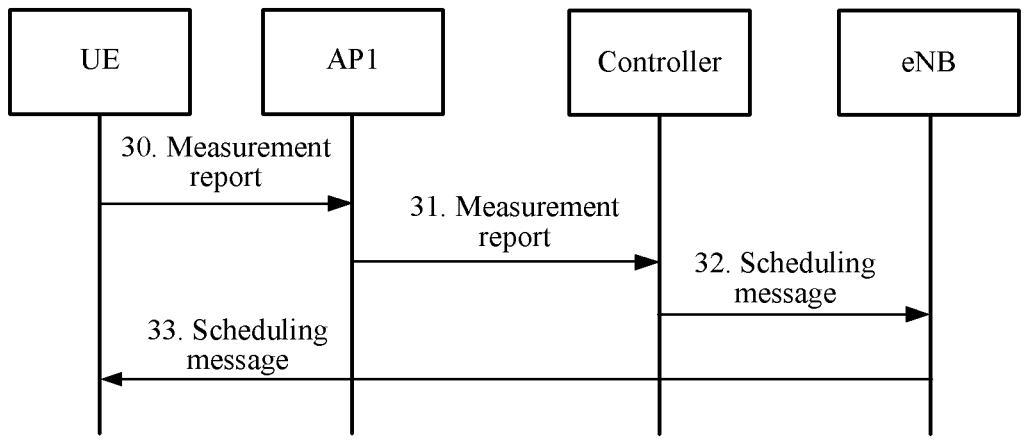
FIG. 7 is a schematic diagram of signaling exchange in a handover processing method according to Embodiment 6 of the present invention.

FIG. 7 is a schematic diagram of signaling exchange in a handover processing method according to Embodiment 6 of the present invention. Referring to FIG. 7, Embodiment 6 includes the following steps:

Step 30: UE sends a measurement report to AP1 (a serving cell).

Step 31: AP1 forwards the measurement report to a controller.

Specifically, an interface between AP1 and the controller is a newly defined interface; therefore, the measurement report is a new message.

Step 32: The controller sends a scheduling message to an eNB.

Specifically, the scheduling message informs the eNB of a macro cell that the eNB is capable of scheduling UE within coverage of the eNB.

Step 33: The eNB of a macro cell sends the scheduling message to the UE.

Because a TA between the UE and an AP is consistent with a TA between the UE and a macro eNB of a target cell, the UE does not need to perform a RACH process. The macro eNB of the target cell directly schedules the UE. The eNB sends the scheduling message to the UE, where the message includes but is not limited to resource assignment information, a modulation and coding scheme, codebook information, power control information, and the like. After receiving the scheduling message sent by the eNB, the UE starts to perform normal communication with the macro eNB of the target cell.

In Embodiment 6, a RACH process can be omitted, and a handover procedure is changed to a scheduling process, so that a handover delay is reduced, an interruption time is reduced, and a system throughput is improved.

Figure 8:
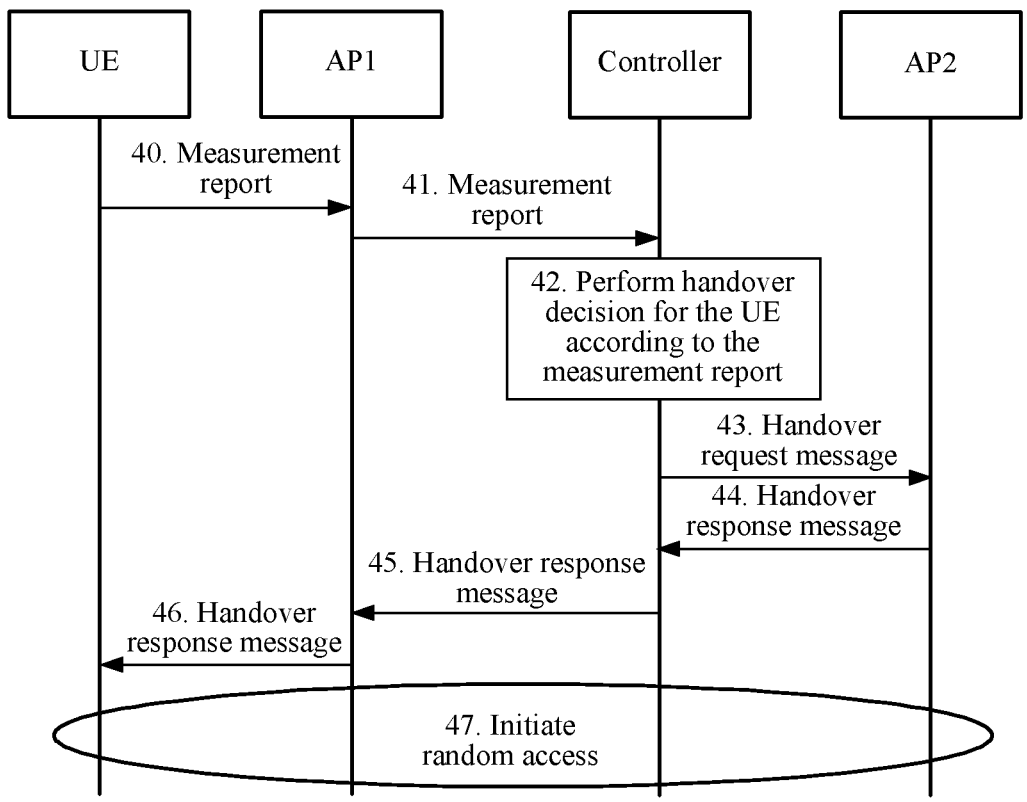
FIG. 8 is a schematic diagram of signaling exchange in a handover processing method according to Embodiment 7 of the present invention.

FIG. 8 is a schematic diagram of signaling exchange in a handover processing method according to Embodiment 7 of the present invention. Referring to FIG. 8, Embodiment 7 includes the following steps:

Step 40: UE sends a measurement report to AP1 (a serving cell).

Step 41: AP1 forwards the measurement report to a controller.

Specifically, an interface between AP1 and the controller is a newly defined interface; therefore, the measurement report is a new message. The controller comprehensively considers a measurement result reported by the UE (the controller can learn signal quality or signal strength of each neighboring cell that is reported by the UE), and the controller performs handover decision for the UE, so as to determine a target cell of the UE, for example, determine that the target cell is AP2 of a small cell.

Step 42: The controller performs handover decision for the UE according to the measurement report.

Step 43: The controller sends a handover request message to AP2 of a small cell (a target cell).

Specifically, for a format of the handover request message, reference may be made to Table 1 above, and details are not described herein again. If a new interface exists between the controller and AP2, the interface may be named Xm interface. Alternatively, the interface may be an X2 interface that already exists, and if the interface is an existing X2 interface, the handover request message in step 43 is not a piece of new signaling. Refer to Table 1, an Older AP UE XmAP index is added. This information element uniquely identifies, on the Xm interface, one UE within a range of AP1.

Step 44: AP2 (the target cell) sends a handover response message to the controller.

If a new interface exists between the controller and AP2, the interface may be named Xm interface. Alternatively, the interface may also be an X2 interface that already exists, and if the interface is an existing X2 interface, the handover response message is not a piece of new signaling. For a format of the handover response message, reference may be made to Table 2. Specifically, refer to Table 2. An Old controller UE XnAP ID is added. This information uniquely identifies, on the Xn interface, one UE in one controller. A New eNB UE XnAP ID is added. This information is an ID allocated by a target eNB to the UE.

Step 45: The controller sends a handover response message to AP1.

Specifically, main content of the handover response message (HO command) is a transparent container in the foregoing handover response message.

Step 46: AP1 sends a handover response message (HO command) to the UE.

Specifically, the handover response message (HO command) is a transparent container (transparent container) in the handover response message (HO command) in step 46.

Step 47: The UE initiates random access to AP2 (a rach process).

Figure 9:
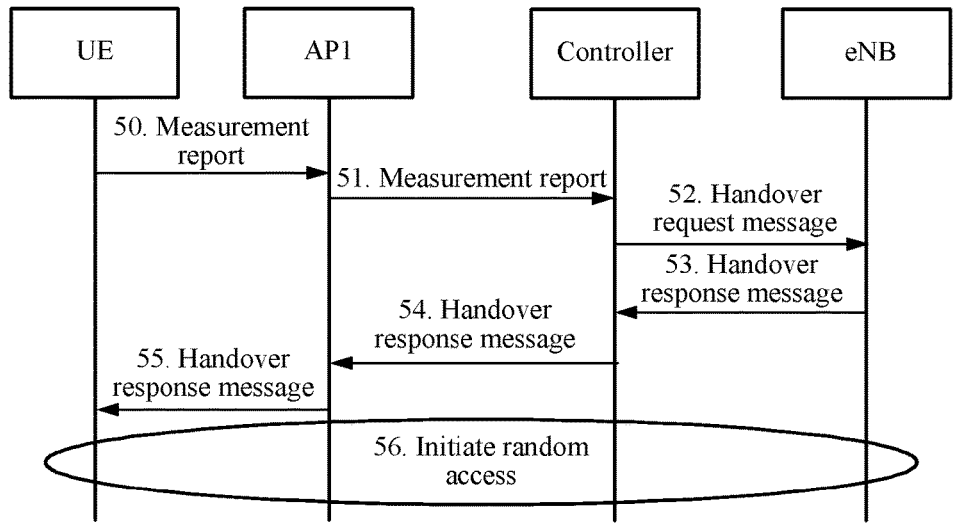
FIG. 9 is a schematic diagram of signaling exchange in a handover processing method according to Embodiment 8 of the present invention.

FIG. 9 is a schematic diagram of signaling exchange in a handover processing method according to Embodiment 8 of the present invention. Referring to FIG. 9, Embodiment 8 includes the following steps:

Step 50: UE sends a measurement report to AP1 of a small cell (a serving cell).

Step 51: AP1 forwards the measurement report to a controller.

Specifically, an interface between AP1 and the controller is a newly defined interface; therefore, the measurement report is a new message. The controller comprehensively considers a measurement result reported by the UE (the controller can learn signal quality or signal strength of each neighboring cell that is reported by the UE), and the controller performs handover decision for the UE, so as to determine a target cell of the UE, for example, determine that the target cell is an eNB. Because the measurement report is transmitted on a direct link between AP1 and the controller, a maximum transmission delay is 5 ms.

Step 52: The controller sends a handover request message to an eNB.

Specifically, because the handover request message is transmitted on a direct link between the controller and the eNB, a maximum transmission delay is 5 ms. For a possible format of the handover request message, refer to Table 3 above, and details are not described herein again. Specifically, refer to Table 3. Because a new interface exists between the controller and the eNB, where the interface is named Xn interface, an Old controller UE XnAP ID is added. This information uniquely identifies, on the Xn interface, one UE within a range of one controller.

Step 53: The eNB sends a handover response message to the controller.

Specifically, because the handover response message is transmitted on the direct link between the controller and the eNB, a maximum transmission delay is 5 ms. For a possible format of the handover response message, refer to Table 4 above, and details are not described herein again. Specifically, refer to Table 4. Because a new interface exists between the controller and the eNB, where the interface is named Xn interface herein, an Old controller UE XnAP ID is added, which uniquely identifies, on the Xn interface, one UE in one controller. A New eNB UE XnAP ID is added, which is an ID allocated by a target eNB to the UE.

Step 54: The controller sends a handover response message to AP1.

Specifically, main content of the handover response message (HO command) is a transparent container in the foregoing handover response message in step 53.

Step 55: AP1 sends a handover response message to the UE.

Specifically, main content of the handover response message (HO command) is a transparent container in the handover response message (HO command) in step 54.

Step 56: The UE initiates random access to the eNB (a rach process).

Figure 10:
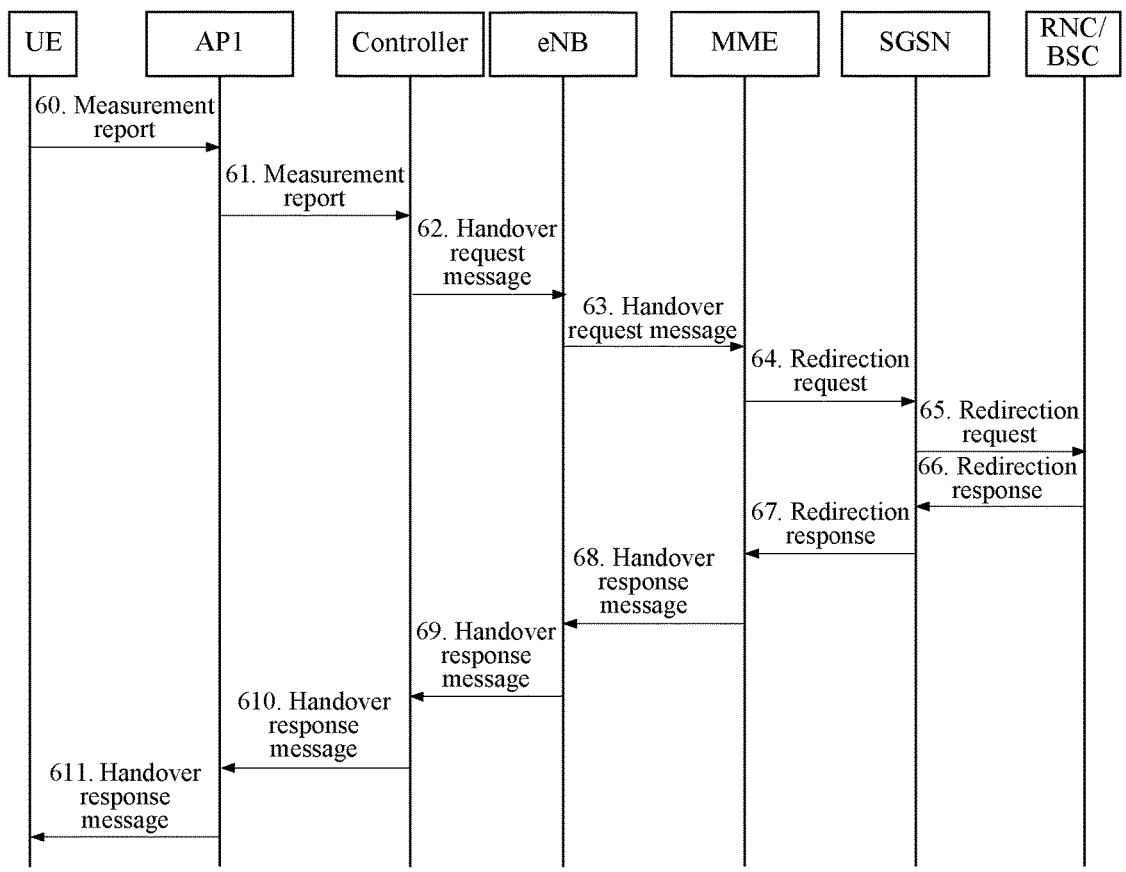
FIG. 10 is a schematic diagram of signaling exchange in a handover processing method according to Embodiment 9 of the present invention.

FIG. 10 is a schematic diagram of signaling exchange in a handover processing method according to Embodiment 9 of the present invention. For a scenario of handover between a serving cell and a system of another mode, an example in which a small cell is a serving cell and handover is targeted at a system of another mode is used. Referring to FIG. 10, Embodiment 9 includes the following steps:

Step 60: UE sends a measurement report to AP1 of a small cell (a serving cell).

Step 61: AP1 forwards the measurement report to a controller.

Specifically, an interface between AP1 and the controller is a newly defined interface; therefore, the measurement report is a new message.

Step 62: The controller sends a handover request message to an eNB.

Specifically, because the handover request message is transmitted on a direct link between the controller and the eNB of a macro cell, a maximum transmission delay is 5 ms. For a possible format of the handover request message, refer to Table 5, and details are not described herein again. Specifically, because a new interface exists between the controller and the eNB of the macro cell, where the interface is named Xn interface, an old controller UE XnAP ID is added. This information uniquely identifies, on the Xn interface, one UE within a range of one controller.

step 63: The eNB of a macro cell sends a handover request message to an MME of a core network.

Step 64: The mobility management entity (MME for short) sends a redirection request to a serving GPRS support node (SGSN for short).

Step 65: The SGSN sends a redirection request to a radio network controller (RNC for short).

Step 66: The RNC sends a redirection response to the SGSN.

Step 67: The SGSN forwards the redirection response to the MME.

Step 68: The MME sends a handover request response to the eNB.

Step 69: The eNB of the macro cell sends a handover response message to the controller.

Specifically, because the handover response message is transmitted on the direct link between the controller and the eNB of the macro cell, a maximum transmission delay is 5 ms. For a possible format of the handover response message, refer to Table 5 above, and details are not described herein again. Specifically, because a new interface exists between the controller and the eNB, where the interface is named Xn interface herein, an Old controller UE XnAP ID is added. This information uniquely identifies, on the Xn interface, one UE in one controller. A New eNB UE XnAP ID is added. This information is an ID allocated by a target eNB to the UE.

Step 610: The controller sends a handover response message to AP1.

Specifically, main content of the handover response message (HO command) is a transparent container in the handover response message in step 69.

Step 611: AP1 sends a handover response message to the UE.

Specifically, main content of the handover response message (HO command) is a transparent container in the handover response message (HO command) in step 610.

Beneficial effects of Embodiment 9 are described as follows:

A delay between the controller and the eNB is very short; therefore, a handover delay can be reduced by means of support of the controller, so that a handover success rate can be improved, and a system throughput is improved.

It should be noted that, for the foregoing embodiments and the possible implementation manners, if the UE is UE with carrier aggregation (CA carrier aggregation), a possible carrier aggregation manner of the UE is:

Manner 1: aggregation of multiple carriers in one AP node.

Manner 2: aggregation of different carriers in two AP nodes under one controller.

Manner 3: carrier aggregation of a carrier in one AP and a carrier in a macro base station under one controller.

For handover of UE with a CA function, a most possible handover manner is: handover based on a primary component carrier. There may be multiple methods for selecting a primary component carrier, which may be a carrier with greatest signal strength, may be a carrier with best signal quality, or may be a carrier with lightest load (the foregoing descriptions are merely examples, and do not constitute specific limitations). Therefore, the foregoing embodiments are all applicable to handover of UE with a CA function with a change in handover based on a primary component carrier.

Figure 11:
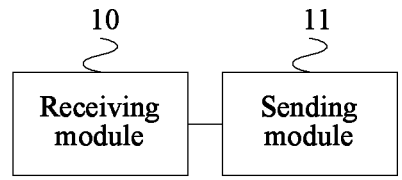
FIG. 11 is a schematic structural diagram of a controller according to Embodiment 10 of the present invention.

FIG. 11 is a schematic structural diagram of a controller according to Embodiment 10 of the present invention. For a network in which small cells are intensively deployed, a controller may be additionally deployed. The controller is directly connected to a small cell managed by the controller, and the controller is directly connected to a base station (eNB) that is controlled by the controller. As shown in FIG. 11, the controller includes: a receiving module 10 and a sending module 11.

The receiving module 10 is configured to receive a first handover trigger message sent by a first network element node.

The sending module 11 is configured to send a second handover trigger message to a second network element node according to the first handover trigger message, so that the second network element node hands over user equipment UE from the first network element node to the second network element node according to the second handover trigger message.

According to the handover processing method provided in this embodiment, a receiving module receives a first handover trigger message sent by a first network element node; and then, a sending module sends a second handover trigger message to a second network element node according to the first handover trigger message, so that the second network element node hands over user equipment UE from the first network element node to the second network element node according to the second handover trigger message. Handover between small cells or between a small cell and a macro cell is implemented, and because a controller is used to perform handover, a handover delay is effectively reduced, and network performance is improved.

Further, when an executing body thereof: the controller has a scheduling function, and the first handover trigger message is a measurement report, the receiving module 10 is specifically configured to receive the measurement report sent by the first network element node; and the sending module 11 is further configured to: after the receiving module 10 receives the measurement report sent by the first network element node, send a stop command message to the first network element node, so that the first network element node stops scheduling for the UE.

Further, when the first network element node has a handover decision function, and the first handover trigger message is a handover request message, the receiving module 10 is specifically configured to receive the handover request message sent by the first network element node; and the sending module 11 is further configured to: after the receiving module 10 receives the handover request message sent by the first network element node, send a stop command message to the first network element node, so that the first network element node stops scheduling for the UE.

Further, when the second handover trigger message is a scheduling message, the sending module 11 is specifically configured to send the scheduling message to the second network element node, so that the second network element node forwards the scheduling message to the UE to complete the handover.

Specifically, the scheduling message includes resource assignment information, a modulation and coding message, codebook information, and power control information.

Figure 12:
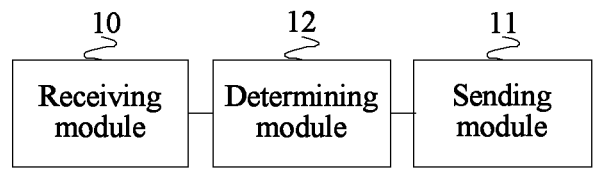
FIG. 12 is a schematic structural diagram of a controller according to Embodiment 11 of the present invention.

Further, when the first handover trigger message is a measurement report, FIG. 12 is a schematic structural diagram of a controller according to Embodiment 11 of the present invention. As shown in FIG. 12, the controller further includes: a determining module 12.

The receiving module 10 is specifically configured to receive the measurement report sent by the first network element node; and the determining module 12 is configured to: after the receiving module 10 receives the measurement report sent by the first network element node, determine, according to the measurement report, to hand over the UE to the second network element node.

Further, when the second handover trigger message is a handover request message, the sending module 11 is specifically configured to send the handover request message to the second network element node, where the handover request message includes a first identifier of the UE.

The first identifier uniquely identifies a sequence number of the UE in the first network element node. For details, refer to Table 1 above, and details are not described herein again.

The receiving module 10 is configured to: after the sending module 11 sends the handover request message to the second network element node, receive a handover response message sent by the second network element node, where the handover response message includes the first identifier of the UE and a second identifier of the UE.

The second identifier uniquely identifies a sequence number of the UE in the second network element node. For details, refer to Table 2 above, and details are not described herein again.

The sending module 11 is further configured to forward the handover response message to the first network element node, so that the first network element node forwards a handover command to the UE to complete the handover.

Further, when the controller has a handover decision function, and a handover procedure involves a scenario of handover from a small cell to a macro cell or from a macro cell to a small cell, specifically, an example in which handover is from a small cell to a macro cell is used for description below. Specifically, the first network element node is the small cell, and the second network element node is the macro cell.

When the second handover trigger message is a handover request message, the sending module 11 is specifically configured to send the handover request message to the second network element node, where the handover request message includes a third identifier of the UE and a fourth identifier.

The third identifier uniquely identifies a sequence number of the UE in the controller, and the fourth identifier is an identity of the first network element node. For details, refer to Table 3 above, and details are not described herein again.

The receiving module 10 is configured to: after the sending module 11 sends the handover request message to the second network element node, receive a handover response message sent by the second network element node, where the handover response message includes the third identifier of the UE, the fourth identifier, and a second identifier of the UE.

The second identifier uniquely identifies a sequence number of the UE in the second network element node. For details, refer to Table 4 above, and details are not described herein again.

The sending module 11 is further configured to forward the handover response message to the first network element node, so that the first network element node forwards a handover command to the UE to complete the handover.

Further, when the controller has a handover decision function, and a handover procedure involves a scenario of handover from a small cell to a system of another mode or from a system of another mode to a small cell, an example of handover from a small cell to a system of another mode is used for description below, where specifically, the small cell is the first network element node, and the macro cell is the second network element node, which specifically includes:

When the second handover trigger message is a handover request message, the sending module 11 is specifically configured to send the handover request message to the second network element node, where the handover request message includes a first identifier and a third identifier of the UE. For details, refer to Table 5 above, and details are not described herein again.

The receiving module 10 is configured to: after the sending module 11 sends the handover request message to the second network element node, receive a handover response message sent by the second network element node, where the handover response message includes the first identifier and the third identifier of the UE and a second identifier of the UE. For details, refer to Table 6 above, and details are not described herein again.

The sending module 11 is further configured to forward the handover response message to the first network element node, so that the first network element node forwards a handover command to the UE to complete the handover.

For the foregoing Embodiment 10 and the possible implementation manners, for a scenario in which the UE needs to be directly handed over to an eNB of a macro cell when a movement speed of the UE exceeds a threshold, the scenario is described below. There are specifically two possible cases:

Case 1: The receiving module 10 is further configured to: if the first network element node is a macro base station, receive a handover indication message sent by the first network element node; and the sending module 11 is further configured to forward the handover indication message to the UE, so that the UE is handed over to the first network element node.

Case 2: The receiving module 10 is further configured to: if the second network element node is a macro base station, receive a handover indication message sent by the second network element node; and the sending module 11 is further configured to forward the handover indication message to the UE, so that the UE is handed over to the second network element node.

Figure 13:
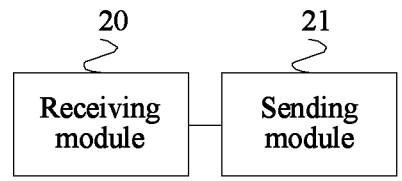
FIG. 13 is a schematic structural diagram of a first network element node according to Embodiment 12 of the present invention.

FIG. 13 is a schematic structural diagram of a first network element node according to Embodiment 12 of the present invention. As shown in FIG. 13, the first network element node includes: a receiving module 20 and a sending module 21.

The receiving module 20 is configured to receive a measurement report sent by user equipment UE.

The sending module 21 is configured to send a first handover trigger message to a controller according to the measurement report.

The sending module 21 is further configured to send a second handover trigger message to a second network element node, to hand over the UE from the first network element node to the second network element node.

According to the handover processing method provided in this embodiment, a receiving module receives a measurement report sent by user equipment UE; and then, a sending module sends a first handover trigger message to a controller according to the measurement report, and the sending module sends a second handover trigger message to a second network element node, so as to hand over the UE from a first network element node to the second network element node. Handover between small cells or between a small cell and a macro cell is implemented by using a controller, and because the controller is used to perform handover, a handover delay is effectively reduced, and network performance is improved.

Further, when the controller has a scheduling function, and the first handover trigger message is a measurement report, the sending module 21 is specifically configured to forward the measurement report to the controller.

Figure 14:
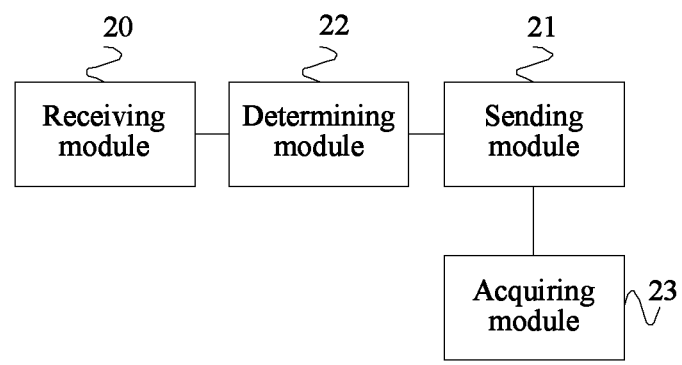
FIG. 14 is a schematic structural diagram of a first network element node according to Embodiment 13 of the present invention.

Further, when the first handover trigger message is a handover request message, FIG. 14 is a schematic structural diagram of a first network element node according to Embodiment 13 of the present invention. As shown in FIG.

14, the first network element node further includes: a determining module 22 and an acquiring module 23.

The determining module 22 is configured to determine, according to the measurement report, to hand over the UE to the second network element node.

The sending module 21 is specifically configured to send the handover request message to the controller.

Further, the receiving module 20 is further configured to: after the sending module 21 sends the first handover trigger message to the controller according to the measurement report, receive a stop command message sent by the controller, and stop scheduling for the UE according to the stop command message.

Further, when the controller has a handover decision function, and the first handover trigger message is the measurement report, the sending module 21 is specifically configured to forward the measurement report to the controller.

The receiving module 20 is specifically configured to: after the sending module 21 forwards the measurement report to the controller, receive a handover response message sent by the controller, where the handover response message includes a first identifier of the UE and a second identifier of the UE.

The first identifier uniquely identifies a sequence number of the UE in the first network element node, and the second identifier uniquely identifies a sequence number of the UE in the second network element node. For details, reference may be made to Table 2 above, and details are not described herein again.

The sending module 21 is further configured to send a handover command to the UE according to the handover response message, so that the UE is handed over from the first network element node to the second network element node according to the handover command.

Further, when the controller has a handover decision function, and a handover involves a scenario of handover from a small cell to a macro cell or from a macro cell to a small cell, an example in which handover is from a small cell to a macro cell, the small cell is the first network element node, and the macro cell is the second network element node is used for description below, which specifically includes:

The first handover trigger message is the measurement report.

Therefore, the sending module 21 is specifically configured to forward the measurement report to the controller.

The receiving module 20 is specifically configured to: after the sending module 21 forwards the measurement report to the controller, receive a handover response message sent by the controller, where the handover response message includes a third identifier of the UE, a fourth identifier, and a second identifier of the UE.

The third identifier uniquely identifies a sequence number of the UE in the controller, and the fourth identifier is an identity of the first network element node. For details, reference may be made to Table 4 above, and details are not described herein again.

The sending module 21 is further configured to send a handover command to the UE according to the handover response message, so that the UE is handed over from the first network element node to the second network element node according to the handover command.

Further, when the controller has a handover decision function, and a handover involves a scenario of handover from a small cell to a system of another mode or from a system of another mode to a small cell, an example in which handover is from a small cell to a system of another mode, the small cell is the first network element node, and the macro cell is the second network element node is used for description below, which specifically includes:

The first handover trigger message is the measurement report.

Therefore, the sending module 21 is specifically configured to forward the measurement report to the controller.

The receiving module 20 is specifically configured to: after the sending module 21 forwards the measurement report to the controller, receive a handover response message sent by the controller, where the handover response message includes a first identifier and a third identifier of the UE and a second identifier of the UE. For details, reference may be made to Table 6 above, and details are not described herein again.

The sending module 21 is further configured to send a handover command to the UE according to the handover response message, so that the UE is handed over from the first network element node to the second network element node according to the handover command.

For the foregoing Embodiment 12 and Embodiment 13, for a scenario in which the UE needs to be directly handed over to an eNB of a macro cell when a movement speed of the UE exceeds a threshold, the scenario is described below with reference to FIG. 14:

There are specifically two cases for the scenario:

Case 1: The acquiring module 23 is configured to acquire a real-time movement speed of the UE, and compare the real-time movement speed with a threshold; and if the real-time movement speed is greater than or equal to the threshold, the sending module 21 is configured to send a handover indication message to the controller, and forward the handover indication message to the UE, so that the UE is handed over to the first network element node; and the sending module 21 is further configured to send a configuration stop indication to the second network element node, so that the second network element node stops performing resource configuration for the UE.

Case 2: The receiving module 20 is further configured to receive a speed comparison result sent by the UE, send a handover indication message to the controller, and forward a handover indication message to the UE, so that the UE is handed over to the first network element node; and the sending module 21 is further configured to send a configuration stop indication to the second network element node, so that the second network element node stops performing resource configuration for the UE.

Figure 15:
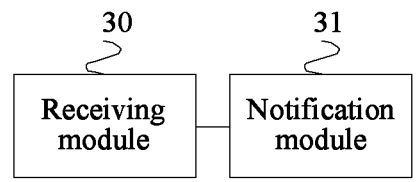
FIG. 15 is a schematic structural diagram of a second network element node according to Embodiment 14 of the present invention.

FIG. 15 is a schematic structural diagram of a second network element node according to Embodiment 14 of the present invention. As shown in FIG. 15, the second network element node includes a receiving module 30 and a notification module 31.

The receiving module 30 is configured to receive a second handover trigger message sent by a controller.

The notification module 31 is configured to notify, according to the second handover trigger message, user equipment UE to be handed over from a first network element node to the second network element node.

According to the handover processing method provided in this embodiment, a receiving module receives a second handover trigger message sent by a controller; and then, a notification module notifies, according to the second handover trigger message, user equipment UE to be handed over from a first network element node to a second network element node. Handover between small cells or between a small cell and a macro cell is implemented, and because a controller is used to perform handover, a handover delay is effectively reduced, and network performance is improved.

Further, when the controller has a scheduling function, and the second handover trigger message is a scheduling message, the notification module 31 is specifically configured to forward the scheduling message to the UE, so that the UE is handed over from the first network element node to the second network element node according to the scheduling message.

Further, when the first network element node has a handover decision function, and the second handover trigger message is a handover request message, the handover request message includes a first identifier of the UE.

Specifically, the first identifier uniquely identifies a sequence number of the UE in the first network element node. Refer to Table 1 above, and details are not described herein again.

The notification module 31 is specifically configured to send a handover response message to the controller, so that the controller forwards the handover response message to the UE, so that the UE is handed over from the first network element node to the second network element node.

The handover response message includes the first identifier of the UE and a second identifier of the UE. The second identifier uniquely identifies a sequence number of the UE in the second network element node. For details, refer to Table 2 above, and details are not described herein again.

Further, when the controller has a handover decision function, and a handover involves a scenario of handover from a small cell to a macro cell or from a macro cell to a small cell, an example in which handover is from a small cell to a macro cell, the small cell is the first network element node, and the macro cell is the second network element node is used for description below, which specifically includes:

The second handover trigger message is a handover request message, and the handover request message includes a third identifier of the UE and a fourth identifier.

The third identifier uniquely identifies a sequence number of the UE in the controller, and the fourth identifier is an identity of the first network element node. For details, refer to Table 3 above, and details are not described herein again.

The notification module 31 is specifically configured to send a handover response message to the controller, so that the controller forwards the handover response message to the UE, so that the UE is handed over from the first network element node to the second network element node.

The handover response message includes the third identifier of the UE, the fourth identifier, and a second identifier of the UE.

The second identifier uniquely identifies a sequence number of the UE in the second network element node. For details, refer to Table 4 above, and details are not described herein again.

Further, when the controller has a handover decision function, and a handover procedure involves a scenario of handover from a small cell to a system of another mode or from a system of another mode to a small cell, an example in which handover is from a small cell to a system of another mode, the small cell is the first network element node, and the macro cell is the second network element node is used for description below.

The second handover trigger message is a handover request message, and the handover request message includes a first identifier and a third identifier of the UE. For details, refer to Table 5 above, and details are not described herein again.

The notification module 31 is configured to send a handover response message to the controller, so that the controller forwards the handover response message to the UE, so that the UE is handed over from the first network element node to the second network element node.

The handover response message includes the first identifier and the third identifier of the UE and a second identifier of the UE.

Figure 16:
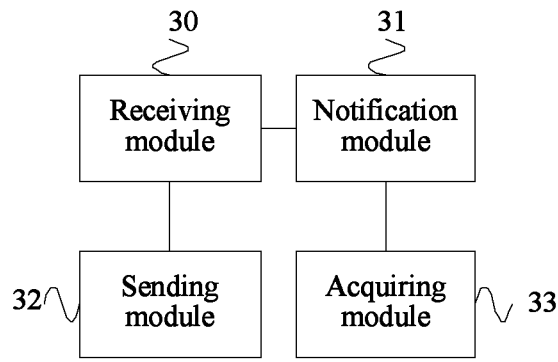
FIG. 16 is a schematic structural diagram of a second network element node according to Embodiment 15 of the present invention.

Based on FIG. 15, FIG. 16 is a schematic structural diagram of a second network element node according to Embodiment 15 of the present invention. As shown in FIG. 16, the second network element node further includes: a sending module 32 and an acquiring module 33.

The sending module 32 is configured to: after the receiving module 30 receives the second handover trigger message sent by the controller, send a forward relocation request to a network element node of another mode.

The receiving module 30 is further configured to: before the notification module 31 sends the handover response message to the controller, receive a forward relocation response sent by a heterogeneous network element node.

For the foregoing Embodiment 15 and Embodiment 16 and the possible implementation manners, for a scenario in which the UE needs to be directly handed over to an eNB of a macro cell when a movement speed of the UE exceeds a threshold, the scenario is described below with reference to FIG. 16. There are specifically two possible cases for the scenario:

Case 1: The acquiring module 33 is configured to acquire a real-time movement speed of the UE, and compare the real-time movement speed with a threshold; and if the real-time movement speed is greater than or equal to the threshold, the notification module 31 is configured to send a handover indication message to the controller, and forward the handover indication message to the UE, so that the UE is handed over to the second network element node; and the notification module 31 is further configured to send a configuration stop indication to the first network element node, so that the first network element node stops performing resource configuration for the UE.

Alternatively, case 2: The receiving module 30 is further configured to receive a speed comparison result sent by the UE;

the notification module 31 is configured to send a handover indication message to the controller, and forward the handover indication message to the UE, so that the UE is handed over to the second network element node; and the notification module 31 is further configured to send a configuration stop indication to the first network element node, so that the first network element node stops performing resource configuration for the UE.

An embodiment of the present invention provides a handover processing system. The handover processing system includes: the controller shown in FIG. 11 and FIG. 12, which can perform corresponding steps provided in FIG. 2, which are not described in detail herein again; the first network element node shown in FIG. 13 and FIG. 14, which can perform corresponding steps provided in FIG. 3; and the second network element node shown in FIG. 15 and FIG. 16, which can perform corresponding steps provided in FIG. 4.

Figure 17:
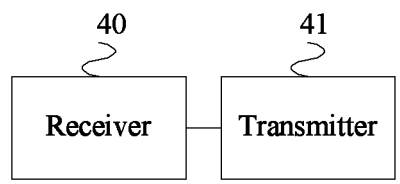
FIG. 17 is a schematic structural diagram of a controller according to Embodiment 16 of the present invention.

FIG. 17 is a schematic structural diagram of a controller according to Embodiment 16 of the present invention. For a network in which small cells are intensively deployed, a controller may be additionally deployed. The controller is directly connected to a small cell managed by the controller, and the controller is directly connected to a base station (eNB) that is controlled by the controller. As shown in FIG. 11, the controller includes: a receiver 40 and a transmitter 41.

The receiver 40 configured to receive a first handover trigger message sent by a first network element node.

The transmitter 41 is configured to send a second handover trigger message to a second network element node according to the first handover trigger message, so that the second network element node hands over user equipment UE from the first network element node to the second network element node according to the second handover trigger message.

According to the handover processing method provided in this embodiment, a receiver receives a first handover trigger message sent by a first network element node; and then, a transmitter sends a second handover trigger message to a second network element node according to the first handover trigger message, so that the second network element node hands over user equipment UE from a first network element node to the second network element node according to the second handover trigger message. Handover between small cells or between a small cell and a macro cell is implemented, and because a controller is used to perform handover, a handover delay is effectively reduced, and network performance is improved.

Further, when an executing body thereof: the controller has a scheduling function, and the first handover trigger message is a measurement report, the receiver 40 is specifically configured to receive the measurement report sent by the first network element node; and the transmitter 41 is further configured to: after the receiver 40 receives the measurement report sent by the first network element node, send a stop command message to the first network element node, so that the first network element node stops scheduling for the UE.

Further, when the first network element node has a handover decision function, and the first handover trigger message is a handover request message, the receiver 40 is specifically configured to receive the handover request message sent by the first network element node; and the transmitter 41 is further configured to: after the receiver 40 receives the handover request message sent by the first network element node, send a stop command message to the first network element node, so that the first network element node stops scheduling for the UE.

Further, when the second handover trigger message is a scheduling message, the transmitter 41 is specifically configured to send the scheduling message to the second network element node, so that the second network element node forwards the scheduling message to the UE to complete the handover.

Specifically, the scheduling message includes resource assignment information, a modulation and coding message, codebook information, and power control information.

Figure 18:
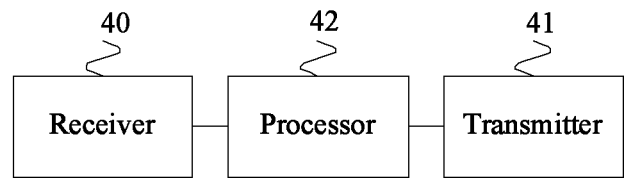
FIG. 18 is a schematic structural diagram of a controller according to Embodiment 17 of the present invention.

Further, when the first handover trigger message is a measurement report, FIG. 18 is a schematic structural diagram of a controller according to Embodiment 17 of the present invention. As shown in FIG. 18, the controller further includes: a processor 42.

The receiver 40 is specifically configured to receive the measurement report sent by the first network element node; and the processor 42 is configured to: after the receiver 40 receives the measurement report sent by the first network element node, determine, according to the measurement report, to hand over the UE to the second network element node.

Further, when the second handover trigger message is a handover request message, the transmitter 41 is specifically configured to send the handover request message to the second network element node, where the handover request message includes a first identifier of the UE.

The first identifier uniquely identifies a sequence number of the UE in the first network element node. For details, refer to Table 1 above, and details are not described herein again.

The receiver 40 is configured to: after the transmitter 41 sends the handover request message to the second network element node, receive a handover response message sent by the second network element node, where the handover response message includes the first identifier of the UE and a second identifier of the UE.

The second identifier uniquely identifies a sequence number of the UE in the second network element node. For details, refer to Table 2 above, and details are not described herein again.

The transmitter 41 is further configured to forward the handover response message to the first network element node, so that the first network element node forwards a handover command to the UE to complete the handover.

Further, when the controller has a handover decision function, and a handover procedure involves a scenario of handover from a small cell to a macro cell or from a macro cell to a small cell, specifically, an example in which handover is from a small cell to a macro cell is used for description below. Specifically, the first network element node is the small cell, and the second network element node is the macro cell.

When the second handover trigger message is a handover request message, the transmitter 41 is specifically configured to send the handover request message to the second network element node, where the handover request message includes a third identifier of the UE and a fourth identifier.

The third identifier uniquely identifies a sequence number of the UE in the controller, and the fourth identifier is an identity of the first network element node. For details, refer to Table 3 above, and details are not described herein again.

The receiver 40 is configured to: after the transmitter 41 sends the handover request message to the second network element node, receive a handover response message sent by the second network element node, where the handover response message includes the third identifier of the UE, the fourth identifier, and a second identifier of the UE.

The second identifier uniquely identifies a sequence number of the UE in the second network element node. For details, refer to Table 4 above, and details are not described herein again.

The transmitter 41 is further configured to forward the handover response message to the first network element node, so that the first network element node forwards a handover command to the UE to complete the handover.

Further, when the controller has a handover decision function, and a handover procedure involves a scenario of handover from a small cell to a system of another mode or from a system of another mode to a small cell, an example of handover from a small cell to a system of another mode is used for description below, where specifically, the small cell is the first network element node, and the macro cell is the second network element node, which specifically includes:

When the second handover trigger message is a handover request message, the transmitter 41 is specifically configured to send the handover request message to the second network element node, where the handover request message includes a first identifier and a third identifier of the UE. For details, refer to Table 5 above, and details are not described herein again.

The receiver 40 is configured to: after the transmitter 41 sends the handover request message to the second network element node, receive a handover response message sent by the second network element node, where the handover response message includes the first identifier and the third identifier of the UE and a second identifier of the UE. For details, refer to Table 6 above, and details are not described herein again.

The transmitter 41 is further configured to forward the handover response message to the first network element node, so that the first network element node forwards a handover command to the UE to complete the handover.

For the foregoing Embodiment 16, Embodiment 17, and the possible implementation manners, for a scenario in which the UE needs to be directly handed over to an eNB of a macro cell when a movement speed of the UE exceeds a threshold, the scenario is described below. There are specifically two possible cases:

Case 1: The receiver 40 is further configured to: if the first network element node is a macro base station, receive a handover indication message sent by the first network element node; and the transmitter 41 is further configured to forward the handover indication message to the UE, so that the UE is handed over to the first network element node.

Case 2: The receiver 40 is further configured to: if the second network element node is a macro base station, receive a handover indication message sent by the second network element node; and the transmitter 41 is further configured to forward the handover indication message to the UE, so that the UE is handed over to the second network element node.

Figure 19:
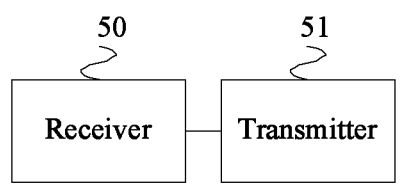
FIG. 19 is a schematic structural diagram of a first network element node according to Embodiment 18 of the present invention.

FIG. 19 is a schematic structural diagram of a first network element node according to Embodiment 18 of the present invention. As shown in FIG. 19, the first network element node includes: a receiver 50 and a transmitter 51.

The receiver 50 is configured to receive a measurement report sent by user equipment UE.

The transmitter 51 is configured to send a first handover trigger message to a controller according to the measurement report.

The transmitter 51 is further configured to send a second handover trigger message to a second network element node, to hand over the UE from the first network element node to the second network element node.

According to the handover processing method provided in this embodiment, a receiver receives a measurement report sent by user equipment UE; and then, a transmitter sends a first handover trigger message to a controller according to the measurement report, and the transmitter sends a second handover trigger message to a second network element node, so as to hand over the UE from a first network element node to the second network element node. Handover between small cells or between a small cell and a macro cell is implemented by using a controller, and because the controller is used to perform handover, a handover delay is effectively reduced, and network performance is improved.

Further, when the controller has a scheduling function, and the first handover trigger message is the measurement report, the transmitter 51 is specifically configured to forward the measurement report to the controller.

Figure 20:
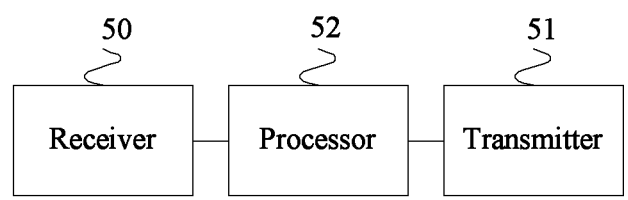
FIG. 20 is a schematic structural diagram of a first network element node according to Embodiment 19 of the present invention.

Further, when the first handover trigger message is a handover request message, FIG. 20 is a schematic structural diagram of a first network element node according to Embodiment 19 of the present invention. As shown in FIG. 20, the first network element node further includes: a processor 52.

The processor 52 is configured to determine, according to the measurement report, to hand over the UE to the second network element node.

The transmitter 51 is specifically configured to send the handover request message to the controller.

Further, the receiver 50 is further configured to: after the transmitter 51 sends the first handover trigger message to the controller according to the measurement report, receive a stop command message sent by the controller, and stop scheduling for the UE according to the stop command message.

Further, when the controller has a handover decision function, and the first handover trigger message is the measurement report, the transmitter 51 is specifically configured to forward the measurement report to the controller.

The receiver 50 is specifically configured to: after the transmitter 51 forwards the measurement report to the controller, receive a handover response message sent by the controller, where the handover response message includes a first identifier of the UE and a second identifier of the UE.

The first identifier uniquely identifies a sequence number of the UE in the first network element node, and the second identifier uniquely identifies a sequence number of the UE in the second network element node. For details, reference may be made to Table 2 above, and details are not described herein again.

The transmitter 51 is further configured to send a handover command to the UE according to the handover response message, so that the UE is handed over from the first network element node to the second network element node according to the handover command.

Further, when the controller has a handover decision function, and a handover involves a scenario of handover from a small cell to a macro cell or from a macro cell to a small cell, an example in which handover is from a small cell to a macro cell, the small cell is the first network element node, and the macro cell is the second network element node is used for description below, which specifically includes:

The first handover trigger message is the measurement report.

Therefore, the transmitter 51 is specifically configured to forward the measurement report to the controller.

The receiver 50 is specifically configured to: after the transmitter 51 forwards the measurement report to the controller, receive a handover response message sent by the controller, where the handover response message includes a third identifier of the UE, a fourth identifier, and a second identifier of the UE.

The third identifier uniquely identifies a sequence number of the UE in the controller, and the fourth identifier is an identity of the first network element node. For details, reference may be made to Table 4 above, and details are not described herein again.

The transmitter 51 is further configured to send a handover command to the UE according to the handover response message, so that the UE is handed over from the first network element node to the second network element node according to the handover command.

Further, when the controller has a handover decision function, and a handover involves a scenario of handover from a small cell to a system of another mode or from a system of another mode to a small cell, an example in which handover is from a small cell to a system of another mode, the small cell is the first network element node, and the macro cell is the second network element node is used for description below, which specifically includes:

The first handover trigger message is the measurement report.

Therefore, the transmitter 51 is specifically configured to forward the measurement report to the controller.

The receiver 50 is specifically configured to: after the transmitter 51 forwards the measurement report to the controller, receive a handover response message sent by the controller, where the handover response message includes a first identifier and a third identifier of the UE and a second identifier of the UE. For details, reference may be made to Table 6 above, and details are not described herein again.

The transmitter 51 is further configured to send a handover command to the UE according to the handover response message, so that the UE is handed over from the first network element node to the second network element node according to the handover command.

For the foregoing Embodiment 18 and Embodiment 19, for a scenario in which the UE needs to be directly handed over to an eNB of a macro cell when a movement speed of the UE exceeds a threshold, the scenario is described below with reference to FIG. 14:

There are specifically two cases for the scenario:

Case 1: The processor 52 is configured to acquire a real-time movement speed of the UE, and compare the real-time movement speed with a threshold; and if the real-time movement speed is greater than or equal to the threshold, the transmitter 51 is configured to send a handover indication message to the controller, and forward the handover indication message to the UE, so that the UE is handed over to the first network element node; and the transmitter 51 is further configured to send a configuration stop indication to the second network element node, so that the second network element node stops performing resource configuration for the UE.

Case 2: The receiver 50 is further configured to receive a speed comparison result sent by the UE, send a handover indication message to the controller, and forward a handover indication message to the UE, so that the UE is handed over to the first network element node; and the transmitter 51 is further configured to send a configuration stop indication to the second network element node, so that the second network element node stops performing resource configuration for the UE.

Figure 21:
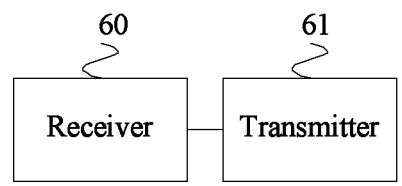
FIG. 21 is a schematic structural diagram of a second network element node according to Embodiment 20 of the present invention.

FIG. 21 is a schematic structural diagram of a second network element node according to Embodiment 20 of the present invention. As shown in FIG. 21, the second network element node includes: a receiver 60 and a transmitter 61.

The receiver 60 is configured to receive a second handover trigger message sent by a controller.

The transmitter 61 is configured to notify, according to the second handover trigger message, user equipment UE to be handed over from a first network element node to the second network element node.

According to the handover processing method provided in this embodiment, a receiver receives a second handover trigger message sent by a controller; and then, a transmitter notifies, according to the second handover trigger message, user equipment UE to be handed over from a first network element node to a second network element node. Handover between small cells or between a small cell and a macro cell is implemented, and because a controller is used to perform handover, a handover delay is effectively reduced, and network performance is improved.

Further, when the controller has a scheduling function, and the second handover trigger message is a scheduling message, the transmitter 61 is specifically configured to forward the scheduling message to the UE, so that the UE is handed over from the first network element node to the second network element node according to the scheduling message.

Further, when the first network element node has a handover decision function, and the second handover trigger message is a handover request message, the handover request message includes a first identifier of the UE.

Specifically, the first identifier uniquely identifies a sequence number of the UE in the first network element node. Refer to Table 1 above, and details are not described herein again.

The transmitter 61 is specifically configured to send a handover response message to the controller, so that the controller forwards the handover response message to the UE, so that the UE is handed over from the first network element node to the second network element node.

The handover response message includes the first identifier of the UE and a second identifier of the UE. The second identifier uniquely identifies a sequence number of the UE in the second network element node. For details, refer to Table 2 above, and details are not described herein again.

Further, when the controller has a handover decision function, and a handover involves a scenario of handover from a small cell to a macro cell or from a macro cell to a small cell, an example in which handover is from a small cell to a macro cell, the small cell is the first network element node, and the macro cell is the second network element node is used for description below, which specifically includes:

The second handover trigger message is a handover request message, and the handover request message includes a third identifier of the UE and a fourth identifier.

The third identifier uniquely identifies a sequence number of the UE in the controller, and the fourth identifier is an identity of the first network element node. For details, refer to Table 3 above, and details are not described herein again.

Therefore, the transmitter 61 is specifically configured to send a handover response message to the controller, so that the controller forwards the handover response message to the UE, so that the UE is handed over from the first network element node to the second network element node.

The handover response message includes the third identifier of the UE, the fourth identifier, and a second identifier of the UE.

The second identifier uniquely identifies a sequence number of the UE in the second network element node. For details, refer to Table 4 above, and details are not described herein again.

Further, when the controller has a handover decision function, and a handover procedure involves a scenario of handover from a small cell to a system of another mode or from a system of another mode to a small cell, an example in which handover is from a small cell to a system of another mode, the small cell is the first network element node, and the macro cell is the second network element node is used for description below.

The second handover trigger message is a handover request message, and the handover request message includes a first identifier and a third identifier of the UE. For details, refer to Table 5 above, and details are not described herein again.

Therefore, the transmitter 61 is configured to send the handover response message to the controller, so that the controller forwards the handover response message to the UE, so that the UE is handed over from the first network element node to the second network element node.

The handover response message includes the first identifier and the third identifier of the UE and a second identifier of the UE.

Figure 22:
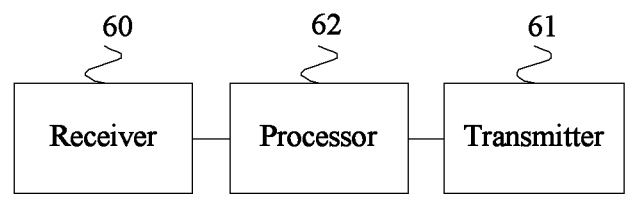
FIG. 22 is a schematic structural diagram of a second network element node according to Embodiment 21 of the present invention.

FIG. 22 is a schematic structural diagram of a second network element node according to Embodiment 21 of the present invention. As shown in FIG. 22, the second network element node further includes: a processor 62.

The transmitter 61 is configured to: after the receiver 60 receives the second handover trigger message sent by the controller, send a forward relocation request to a network element node of another mode.

The receiver 60 is further configured to: before the transmitter 61 sends the handover response message to the controller, receive a forward relocation response sent by a heterogeneous network element node.

For the foregoing Embodiment 20 and Embodiment 21 and the possible implementation manners, for a scenario in which the UE needs to be directly handed over to an eNB of a macro cell when a movement speed of the UE exceeds a threshold, the scenario is described below with reference to FIG. 17. There are specifically two possible cases for the scenario:

Case 1: The processor 62 is configured to acquire a real-time movement speed of the UE, and compare the real-time movement speed with a threshold; and if the real-time movement speed is greater than or equal to the threshold, the transmitter 61 is configured to send a handover indication message to the controller, and forward the handover indication message to the UE, so that the UE is handed over to the second network element node; and the transmitter 61 is further configured to send a configuration stop indication to the first network element node, so that the first network element node stops performing resource configuration for the UE.

Alternatively, case 2: The receiver 60 is further configured to receive a speed comparison result sent by the UE;

the transmitter 61 is configured to send a handover indication message to the controller, and forward the handover indication message to the UE, so that the UE is handed over to the second network element node; and the transmitter 61 is further configured to send a configuration stop indication to the first network element node, so that the first network element node stops performing resource configuration for the UE.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present invention, rather than to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, provided that such modifications or replacements do not cause the essence of corresponding technical solutions to depart from the scope of the technical solutions of the embodiments of the present invention.

What is claimed is:

1. A handover processing method, comprising:
receiving, by a controller, a first handover trigger message sent by a first network element node with respect to handing over a user equipment (UE) from the first network element node; and
sending, by the controller a second handover trigger message to a second network element node according to the first handover trigger message and in response to the receiving the first handover trigger message, to thereby cause the second network element node to hand over user the UE from the first network element node to the second network element node according to the second handover trigger message, wherein:
the first handover trigger message is a handover request message;
the receiving a first handover trigger message sent by a first network element node comprises: receiving the handover request message sent by the first network element node; and
after the receiving the handover request message sent by the first network element node, the method comprises sending a stop command message to the first network element node, to thereby cause the first network element node to stop scheduling for the UE by stopping performing resource configuration for the UE.

2. The handover processing method according to claim 1, wherein:
the second handover trigger message is a scheduling message;
the sending a second handover trigger message to a second network element node according to the first handover trigger message comprises sending the scheduling message to the second network element node, to thereby cause the second network element node to forward the scheduling message to the UE to complete the handover, and
the scheduling message comprises resource assignment information, a modulation and coding message, codebook information, and power control information.

3. The handover processing method according to claim 1, wherein:
the second handover trigger message is a handover request message;
the sending a second handover trigger message to a second network element node comprises sending the handover request message to the second network element node, wherein the handover request message comprises a first identifier of the UE, the first identifier uniquely identifying a sequence number of the UE in the first network element node;
after the sending the handover request message to the second network element node, the method comprises:
receiving a handover response message sent by the second network element node, the handover response message comprising the first identifier of the UE and a second identifier of the UE, and the second identifier uniquely identifying a sequence number of the UE in the second network element node; and forwarding the handover response message to the first network element node, to thereby cause the first network element node to forward a handover command to the UE to complete the handover.

4. The handover processing method according to claim 1, wherein:
the second handover trigger message is a handover request message;
the sending a second handover trigger message to a second network element node comprises sending the handover request message to the second network element node, wherein the handover request message comprises a third identifier of the UE and a fourth identifier, the third identifier uniquely identifying a sequence number of the UE in a controller, and the fourth identifier is an identity of the first network element node; and
after the sending the handover request message to the second network element node, the method further comprises:
receiving a handover response message sent by the second network element node, wherein the handover response message comprises the third identifier of the UE, the fourth identifier, and the second identifier of the UE, the second identifier uniquely identifying a sequence number of the UE in the second network element node; and
forwarding the handover response message to the first network element node, to thereby cause the first network element node to forward a handover command to the UE to complete the handover.

5. A controller, comprising:
a receiver, configured to receive a first handover trigger message sent by a first network element node with respect to handing over a user equipment (UE) from the first network element node; and
a transmitter, configured to send a second handover trigger message to a second network element node according to the first handover trigger message and in response to the receiving the first handover trigger message, to thereby cause the second network element node to hand over the UE from the first network element node to the second network element node according to the second handover trigger message, wherein:
the first handover trigger message is a handover request message;
the receiver is configured to receive the handover request message sent by the first network element node; and
the transmitter is further configured to, after the receiver receives the handover request message sent by the first network element node, send a stop command message to the first network element node, to thereby cause the first network element node to stop scheduling for the UE by stopping performing resource configuration for the UE.

6. The controller according to claim 5, wherein:
the second handover trigger message is a scheduling message; and
the transmitter is configured to send the scheduling message to the second network element node, to thereby cause the second network element node to forward the scheduling message to the UE to complete the handover, the scheduling message comprising resource assignment information, a modulation and coding message, codebook information, and power control information.

7. The controller according to claim 5, wherein:
the second handover trigger message is a handover request message;
the transmitter is configured to send the handover request message to the second network element node, the handover request message comprising a first identifier of the UE, and the first identifier uniquely identifying a sequence number of the UE in the first network element node;
the receiver is configured to, after the transmitter sends the handover request message to the second network element node, receive a handover response message sent by the second network element node, the handover response message comprising the first identifier of the UE and a second identifier of the UE, the second identifier uniquely identifying a sequence number of the UE in the second network element node; and
the transmitter is further configured to forward the handover response message to the first network element node, to thereby cause the first network element node to forward a handover command to the UE to complete the handover.

8. The controller according to claim 5, wherein:
the second handover trigger message is a handover request message;
the transmitter is configured to send the handover request message to the second network element node, the handover request message comprising a third identifier of the UE and a fourth identifier, the third identifier uniquely identifying a sequence number of the UE in the controller, and the fourth identifier is an identity of the first network element node;
the receiver is configured to, after the transmitter sends the handover request message to the second network element node, receive a handover response message sent by the second network element node, the handover response message comprising the third identifier of the UE, the fourth identifier, and a second identifier of the UE, wherein the second identifier uniquely identifies a sequence number of the UE in the second network element node; and
the transmitter is further configured to forward the handover response message to the first network element node, to thereby cause the first network element node to forward a handover command to the UE to complete the handover.

9. The controller according to claim 5, wherein:
the second handover trigger message is a handover request message;
the transmitter is configured to send the handover request message to the second network element node, the handover request message comprising a first identifier and a third identifier of the UE;
the receiver is configured to, after the transmitter sends the handover request message to the second network element node, receive a handover response message sent by the second network element node, the handover response message comprising the first identifier and the third identifier of the UE and a second identifier of the UE; and
the transmitter is further configured to forward the handover response message to the first network element node, to thereby cause the first network element node to forward a handover command to the UE to complete the handover.

10. A first network element node, comprising:
- a receiver, configured to receive a measurement report sent by user equipment (UE); and
- a transmitter, configured to send a first handover trigger message to a controller according to the measurement report, to thereby cause the controller to send a second handover trigger message to a second network element node according to the first handover trigger message and in response to the controller receiving the first handover trigger message, to thereby cause the second network element node to hand over the UE from the first network element node to the second network element node,
- wherein the receiver is further configured to, after the transmitter sends the first handover trigger message to the controller according to the measurement report, receive a stop command message sent by the controller, and stop scheduling for the UE according to the stop command message by stopping performing resource configuration for the UE.

11. The first network element node according to claim 10, wherein:
- the first handover trigger message is the measurement report; and
- the transmitter is configured to forward the measurement report to the controller.

12. The first network element node according to claim 10, wherein:
- the first handover trigger message is a handover request message;
- the first network element node further comprises a processor which is configured to determine, according to the measurement report, to hand over the UE to the second network element node; and
- the transmitter is configured to send the handover request message to the controller upon the processor determining to hand over the UE to the second network element node.

13. The first network element node according to claim 10, wherein:
- the first handover trigger message is the measurement report;
- the transmitter is configured to forward the measurement report to the controller;
- the receiver is configured to, after the transmitter forwards the measurement report to the controller, receive a handover response message sent by the controller, the handover response message comprising a first identifier of the UE and a second identifier of the UE, the first identifier uniquely identifying a sequence number of the UE in the first network element node, and the second identifier uniquely identifying a sequence number of the UE in the second network element node; and
- the transmitter is further configured to send a handover command to the UE according to the handover response message, to thereby cause the UE to be handed over from the first network element node to the second network element node according to the handover command.

14. The first network element node according to claim 13, wherein:
- the first handover trigger message is the measurement report;
- the transmitter is configured to forward the measurement report to the controller;
- the receiver is configured to, after the transmitter forwards the measurement report to the controller, receive a handover response message sent by the controller, the handover response message comprising a third identifier of the UE, a fourth identifier, and the second identifier of the UE, the third identifier uniquely identifying a sequence number of the UE in the controller, and the fourth identifier is an identity of the first network element node; and
- the transmitter is further configured to send a handover command to the UE according to the handover response message, to thereby cause the UE to be handed over from the first network element node to the second network element node according to the handover command.

15. The first network element node according to claim 13, wherein: the first handover trigger message is the measurement report;
- the transmitter is configured to forward the measurement report to the controller;
- the receiver is configured to, after the transmitter forwards the measurement report to the controller, receive a handover response message sent by the controller, the handover response message the first identifier, a third identifier of the UE and the second identifier of the UE; and
- the transmitter is further configured to send a handover command to the UE according to the handover response message, to thereby cause the UE to be handed over from the first network element node to the second network element node according to the handover command.

\* \* \* \* \*